(12) United States Patent
Sridharan et al.

(10) Patent No.: US 12,513,691 B2
(45) Date of Patent: Dec. 30, 2025

(54) INITIAL TRANSMISSION OF A TRANSPORT BLOCK OVER MULTI-SLOTS TRANSMISSION TRIGGERED BY A CONFIGURED GRANT

(71) Applicant: QUALCOMM Incorporated, San Diego, CA (US)

(72) Inventors: Gokul Sridharan, Sunnyvale, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 17/934,449

(22) Filed: Sep. 22, 2022

(65) Prior Publication Data

US 2023/0124808 A1    Apr. 20, 2023

Related U.S. Application Data

(60) Provisional application No. 63/262,669, filed on Oct. 18, 2021.

(51) Int. Cl.
*H04W 72/1268* (2023.01)
*H04L 1/18* (2023.01)
(Continued)

(52) U.S. Cl.
CPC ........... *H04W 72/1268* (2013.01); *H04L 1/18* (2013.01); *H04W 72/0446* (2013.01); *H04W 72/23* (2023.01)

(58) Field of Classification Search
CPC ............. H04W 72/0446; H04W 72/23; H04W 72/1268; H04L 1/18
(Continued)

(56) References Cited

U.S. PATENT DOCUMENTS

2022/0231789 A1*  7/2022  Ying .................. H04L 1/189
2022/0272725 A1*  8/2022  Taherzadeh Boroujeni ............... H04L 1/08
(Continued)

FOREIGN PATENT DOCUMENTS

WO    WO-2020222299 A1    11/2020
WO    WO-2021063620 A1    4/2021
(Continued)

OTHER PUBLICATIONS

International Search Report and Written Opinion—PCT/US2022/076941—ISA/EPO—Dec. 19, 2022.
(Continued)

*Primary Examiner* — Peter G Solinsky
(74) *Attorney, Agent, or Firm* — Paul M. McAdams; Harrity & Harrity, LLP

(57) ABSTRACT

Some aspects described herein provide techniques and apparatuses that enable an initial transmission of a transport block over multi-slots (TBoMS) transmission triggered by a configured grant. In some aspects, a user equipment (UE) may identify a transmission occasion at which to start an initial transmission of a TBoMS transmission triggered by a configured grant. The transmission occasion may correspond to a single slot of the TBoMS transmission, and the transmission occasion may be identified as a first transmission occasion of a first repetition of a set of repetitions or a first transmission occasion of any repetition of the set of repetitions. The transmission occasion may correspond to all slots of one repetition of the TBoMS transmission, and the transmission occasion may be identified as a first transmission occasion of a set of repetitions or any transmission occasion of the set of repetitions.

24 Claims, 12 Drawing Sheets

(51) Int. Cl.
    *H04W 72/0446*    (2023.01)
    *H04W 72/23*      (2023.01)

(58) Field of Classification Search
    USPC .......................................................... 370/329
    See application file for complete search history.

(56) References Cited

U.S. PATENT DOCUMENTS

| | | | | |
|---|---|---|---|---|
| 2022/0303983 A1* | 9/2022 | Ly | ....................... | H04L 1/0009 |
| 2022/0303988 A1* | 9/2022 | Yi | ....................... | H04L 5/0044 |
| 2022/0321269 A1* | 10/2022 | Nhan | ..................... | H04L 1/189 |
| 2022/0322356 A1* | 10/2022 | Ly | ....................... | H04L 5/001 |
| 2022/0322394 A1* | 10/2022 | Yi | ........................ | H04L 1/08 |
| 2023/0345432 A1* | 10/2023 | Deng | .................. | H04L 1/1864 |

FOREIGN PATENT DOCUMENTS

| | | | | |
|---|---|---|---|---|
| WO | WO-2023012723 A1 * | 2/2023 | ............... | H04L 1/08 |
| WO | WO-2023048937 A1 * | 3/2023 | ........ | H04W 72/0446 |

OTHER PUBLICATIONS

Qualcomm Incorporated: "TP for Enhancement to Configured Grants in NR Unlicensed", 3GPP TSG RAN WG1 Meeting #100bis-e, R1-2002533, 3rd Generation Partnership Project, Mobile Competence Centre, 650, Route Des Lucioles, F-06921 Sophia-Antipolis Cedex, France, vol. RAN WG1, No. Online Meeting, Apr. 20, 2020-Apr. 30, 2020, 4 Pages, Apr. 11, 2020, XP051875647, section 2.

* cited by examiner

INITIAL TRANSMISSION OF A TRANSPORT BLOCK OVER MULTI-SLOTS TRANSMISSION TRIGGERED BY A CONFIGURED GRANT

CROSS-REFERENCE TO RELATED APPLICATION

This patent application claims priority to U.S. Provisional Patent Application No. 63/262,669, filed on Oct. 18, 2021, entitled "INITIAL TRANSMISSION OF A TRANSPORT BLOCK OVER MULTI-SLOTS TRANSMISSION TRIGGERED BY A CONFIGURED GRANT," and assigned to the assignee hereof. The disclosure of the prior application is considered part of and is incorporated by reference into this patent application in its entirety.

FIELD OF THE DISCLOSURE

Aspects of the present disclosure generally relate to wireless communication and to techniques and apparatuses for initial transmission of a transport block over multi-slots (TBoMS) transmission triggered by a configured grant.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

As described herein, a transport block over multi-slots (TBoMS) transmission is defined such that the TBoMS transmission is not constrained to a single slot. That is, a TBoMS transmission may include one of more repetitions of a transport block, and each repetition (also referred to as a single TBoMS) can span multiple slots. Therefore, existing rules for identifying a transmission occasion for a Type A physical uplink shared channel (PUSCH) triggered by a configured grant are insufficient to enable identification of a transmission occasion for an initial transmission of a TBoMS transmission triggered by a configured grant.

Some aspects described herein provide techniques and apparatuses that enable an initial transmission of a TBoMS transmission triggered by a configured grant. In some aspects, a UE may identify a transmission occasion at which to start an initial transmission of a TBoMS transmission triggered by a configured grant. In some aspects, the transmission occasion corresponds to a single slot of the TBoMS transmission, and the transmission occasion is identified as one of a first transmission occasion of a first repetition of a set of repetitions, or a first transmission occasion of any repetition of the set of repetitions. In some aspects, the transmission occasion corresponds to all slots of one repetition of the TBoMS transmission (e.g., the TBoMS transmission being configured with one or more repetitions), and the transmission occasion is identified as one of: a first transmission occasion of a set of repetitions, or any transmission occasion of the set of repetitions. In some aspects, the UE may transmit the initial transmission of the TBoMS transmission based at least in part on the transmission occasion. Additional details are provided below.

Some aspects described herein relate to a method of wireless communication performed by a UE. The method may include identifying a transmission occasion at which to start an initial transmission of a TBoMS transmission triggered by a configured grant, where the transmission occasion corresponds to a single slot of the TBoMS transmission, and where the transmission occasion is identified as one of: a first transmission occasion of a first repetition of a set of repetitions, or a first transmission occasion of any repetition of the set of repetitions. The method may include transmitting the initial transmission of the TBoMS transmission based at least in part on the transmission occasion.

Some aspects described herein relate to a method of wireless communication performed by a UE. The method may include identifying a transmission occasion at which to start an initial transmission of a TBoMS transmission triggered by a configured grant, where the transmission occasion corresponds to all slots of one repetition of the TBoMS transmission, the TBoMS transmission being configured with one or more repetitions, and where the transmission occasion is identified as one of: a first transmission occasion of a set of repetitions, or any transmission occasion of the set of repetitions. The method may include transmitting the initial transmission of the TBoMS transmission based at least in part on the transmission occasion.

Some aspects described herein relate to a UE for wireless communication. The user equipment may include a memory and one or more processors coupled to the memory. The one or more processors may be configured to identify a transmission occasion at which to start an initial transmission of a TBoMS transmission triggered by a configured grant, where the transmission occasion corresponds to a single slot of the TBoMS transmission, and where the transmission occasion is identified as one of: a first transmission occasion of a first repetition of a set of repetitions, or a first transmission occasion of any repetition of the set of repetitions. The one or more processors may be configured to transmit the initial transmission of the TBoMS transmission based at least in part on the transmission occasion.

Some aspects described herein relate to a UE for wireless communication. The user equipment may include a memory and one or more processors coupled to the memory. The one or more processors may be configured to identify a transmission occasion at which to start an initial transmission of a TBoMS transmission triggered by a configured grant, where the transmission occasion corresponds to all slots of one repetition of the TBoMS transmission, the TBoMS transmission being configured with one or more repetitions, and where the transmission occasion is identified as one of: a first transmission occasion of a set of repetitions, or any transmission occasion of the set of repetitions. The one or more processors may be configured to transmit the initial transmission of the TBoMS transmission based at least in part on the transmission occasion.

Some aspects described herein relate to a non-transitory computer-readable medium that stores a set of instructions for wireless communication by a UE. The set of instructions, when executed by one or more processors of the UE, may cause the UE to identify a transmission occasion at which to start an initial transmission of a TBoMS transmission triggered by a configured grant, where the transmission occasion corresponds to a single slot of the TBoMS transmission, and where the transmission occasion is identified as one of: a first transmission occasion of a first repetition of a set of repetitions, or a first transmission occasion of any repetition of the set of repetitions. The set of instructions, when executed by one or more processors of the UE, may cause the UE to transmit the initial transmission of the TBoMS transmission based at least in part on the transmission occasion.

Some aspects described herein relate to a non-transitory computer-readable medium that stores a set of instructions for wireless communication by a UE. The set of instructions, when executed by one or more processors of the UE, may cause the UE to identify a transmission occasion at which to start an initial transmission of a TBoMS transmission triggered by a configured grant, where the transmission occasion corresponds to all slots of one repetition of the TBoMS transmission, the TBoMS transmission being configured with one or more repetitions, and where the transmission occasion is identified as one of: a first transmission occasion of a set of repetitions, or any transmission occasion of the set of repetitions. The set of instructions, when executed by one or more processors, may cause the UE to transmit the initial transmission of the TBoMS transmission based at least in part on the transmission occasion.

Some aspects described herein relate to an apparatus for wireless communication. The apparatus may include means for identifying a transmission occasion at which to start an initial transmission of a TBoMS transmission triggered by a configured grant, where the transmission occasion corresponds to a single slot of the TBoMS transmission, and where the transmission occasion is identified as one of: a first transmission occasion of a first repetition of a set of repetitions, or a first transmission occasion of any repetition of the set of repetitions. The apparatus may include means for transmitting the initial transmission of the TBoMS transmission based at least in part on the transmission occasion.

Some aspects described herein relate to an apparatus for wireless communication. The apparatus may include means for identifying a transmission occasion at which to start an initial transmission of a TBoMS transmission triggered by a configured grant, where the transmission occasion corresponds to all slots of one repetition of the TBoMS transmission, the TBoMS transmission being configured with one or more repetitions, and where the transmission occasion is identified as one of: a first transmission occasion of a set of repetitions, or any transmission occasion of the set of repetitions. The apparatus may include means for transmitting the initial transmission of the TBoMS transmission based at least in part on the transmission occasion.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
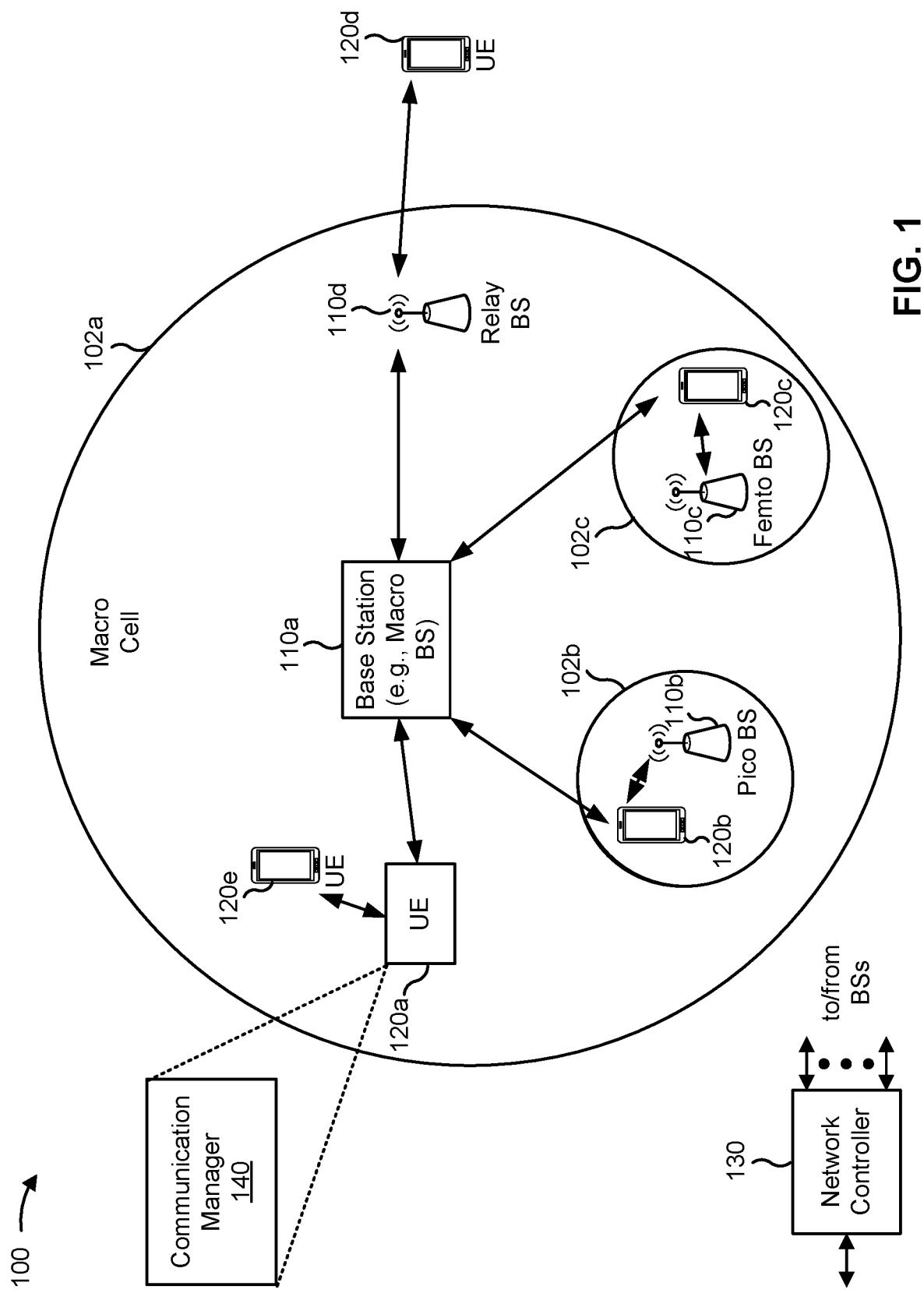
FIG. 1 is diagram illustrating an example of a wireless network, in accordance with the present disclosure.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify a transmission occasion at which to start an initial transmission of a transport block over multi-slots (TBoMS) transmission triggered by a configured grant, wherein the transmission occasion corresponds to a single slot of the TBoMS transmission, and wherein the transmission occasion is identified as one of: a first transmission occasion of a first repetition of a set of repetitions, or a first transmission occasion of any repetition of the set of repetitions; and transmit the initial transmission of the TBoMS transmission based at least in part on the transmission occasion. Additionally, or alternatively, the communication manager 140 may perform one or more other operations described herein.

In some aspects, the UE 120 may include a communication manager 140. As described in more detail elsewhere herein, the communication manager 140 may identify a transmission occasion at which to start an initial transmission of a TBoMS transmission triggered by a configured grant, wherein the transmission occasion corresponds to all slots of one repetition of the TBoMS transmission, the TBoMS transmission being configured with one or more repetitions, and wherein the transmission occasion is identified as one of: a first transmission occasion of a set of repetitions, or any transmission occasion of the set of repetitions; and transmit the initial transmission of the TBoMS transmission based at least in part on the transmission occasion. Additionally, or alternatively, the communication manager 140 may perform one or more other operations described herein.

As indicated above, FIG. 1 is provided as an example. Other examples may differ from what is described with regard to FIG. 1.

Figure 2:
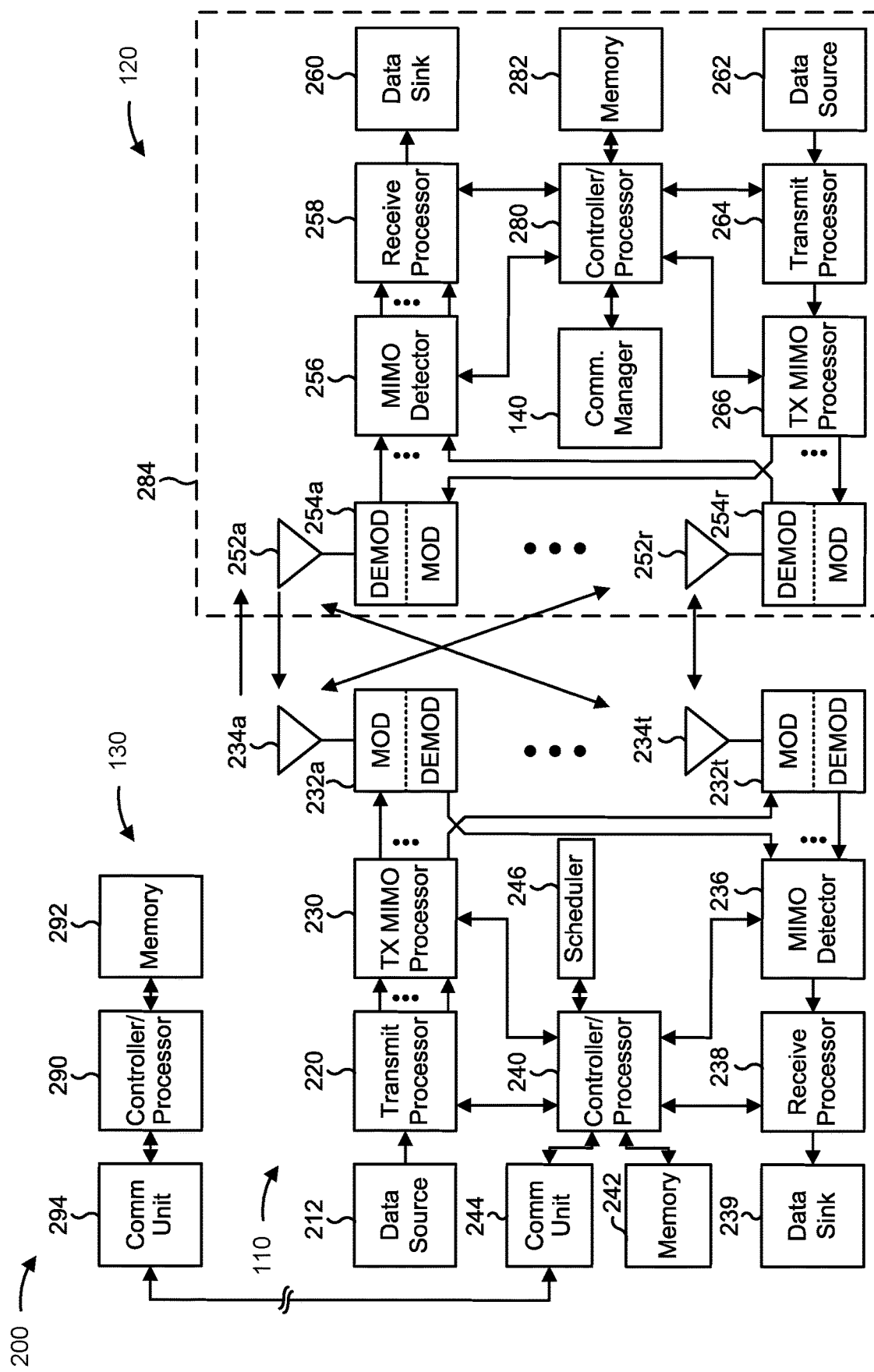
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with initial transmission of a TBoMS transmission triggered by a configured grant, as described in more detail elsewhere herein. For example, the controller/processor 240 of the base station 110, the controller/processor 280 of the UE 120, and/or any other component(s) of FIG. 2 may perform or direct operations of, for example, method 700 of FIG. 7, method 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 700 of FIG. 7, method 800 of FIG. 8, and/or other processes as described herein. In some examples, executing instructions may include running the instructions, converting the instructions, compiling the instructions, and/or interpreting the instructions, among other examples.

In some aspects, the UE includes means for identifying a transmission occasion at which to start an initial transmission of a TBoMS transmission triggered by a configured grant, wherein the transmission occasion corresponds to a single slot of the TBoMS transmission, and wherein the transmission occasion is identified as one of: a first transmission occasion of a first repetition of a set of repetitions, or a first transmission occasion of any repetition of the set of repetitions; and/or means for transmitting the initial transmission of the TBoMS transmission based at least in part on the transmission occasion. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for identifying a transmission occasion at which to start an initial transmission of a TBoMS transmission triggered by a configured grant, wherein the transmission occasion corresponds to all slots of one repetition of the TBoMS transmission, the TBoMS transmission being configured with one or more repetitions, and wherein the transmission occasion is identified as one of: a first transmission occasion of a set of repetitions, or any transmission occasion of the set of repetitions; and/or means for transmitting the initial transmission of the TBoMS transmission based at least in part on the transmission occasion. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
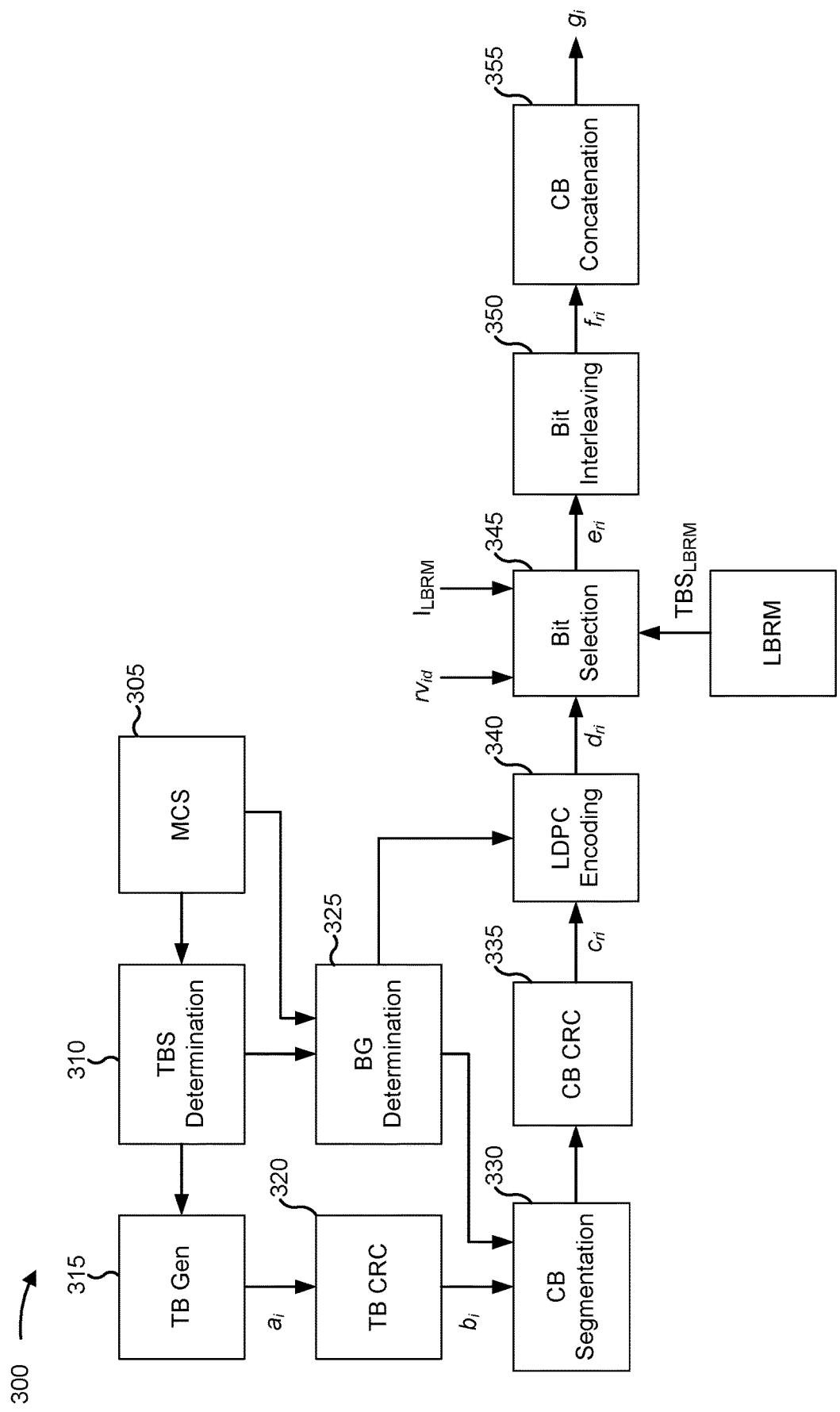
FIG. 3 is a diagram illustrating an example of an uplink transmission coding chain, in accordance with the present disclosure.

FIG. 3 is a diagram illustrating an example 300 of an uplink transmission coding chain, in accordance with the present disclosure. The coding may be used for the transmission of data payloads in a wireless network, such as via a physical uplink shared channel (PUSCH) or a physical downlink shared channel (PDSCH). The operations of FIG. 3 may be performed by a transmitter, such as a UE (e.g., UE 120) or a base station (e.g., base station 110).

The coding chain may be based at least in part on an MCS, which is shown at 305. An MCS is an index indicating a modulation order and a code rate for a communication. For example, an MCS may indicate how many bits can be transmitted per resource element. A modulation indicates a number of bits (whether parity bits or information bits) per resource element, and a code rate indicates a ratio between information bits and parity bits for encoding. Generally, the MCS is indicated via scheduling information for a given communication, such as in downlink control information (DCI).

At 310, the transmitter may determine a transport block size (TBS) based at least in part on the MCS. A TBS indicates how many bits are to be passed from the medium access control (MAC) layer to the physical layer in one instance of a uplink shared channel transmission that may span more than one slot. For example, the payload for the physical layer (e.g., in a PUSCH or a PDSCH) is a transport block. The transport block may include a number of bits, determined based at least in part on the MCS and a number of physical resource blocks (PRBs) to be used to transmit the transport block.

At 315, the transmitter may generate a transport block $a_i$. For example, the transport block may include a number of bits indicated by the TBS of the transport block. At 320, the UE may append a cyclic redundancy check (CRC) to the transport block to form a transport block $b_i$. The CRC aids in error detection. The CRC may be generated using a cyclic generator polynomial and may be appended to an end of the transport block.

At 325, the transmitter may determine a base graph (BG) for the transport block. A BG is a parameter for determining parity bits for a transmission based at least in part on a TBS and a code rate (with BG1 being intended for transport blocks with a larger TBS, and BG2 being intended for transport blocks with a smaller TBS).

At 330, the transmitter may perform codeblock (CB) segmentation for the transport block $b_i$. "CB segmentation" refers to segmentation of the transport block (TB) to form one or more codeblocks for channel coding and rate matching. Each codeblock may be encoded separately, as described below. For example, the steps shown by reference numbers 335 through 350 may be performed for each separate codeblock of the one or more codeblocks. At 335, the transmitter may append one or more CRCs to the one or more codeblocks to form codeblock(s) $c_{ri}$. For example, the transmitter may perform per-codeblock CRC determination and insertion on the one or more codeblocks $c_{ri}$, which aids in early error detection.

At 340, the transmitter may perform low-density parity check (LDPC) encoding on the one or more codeblocks $c_{ri}$, to form encoded bits $d_{ri}$. More generally, the transmitter may perform channel coding according to one or more parameters such as the BG determined at 320. The LDPC encoding may generate a plurality of encoded bits $d_{ri}$, that are stored in a circular buffer, as described in connection with FIG. 4. In some aspects, the encoded bits may be referred to as an encoded codeblock. The encoded bits $d_{ri}$, are distinct from the codeblocks $c_{ri}$.

At 345, the transmitter may perform bit selection. "Bit selection" refers to selecting coded bits (sometimes referred to as encoded bits) $e_{ri}$ (where the totality of the selected coded bits are represented by E) for interleaving and concatenation. For example, the coded bits $e_{ri}$ may be selected from the encoded bits $d_{ri}$. In some cases, "bit selection," limited buffer rate matching (LBRM), and/or bit interleaving are referred to as "rate matching." As shown, the bit selection may be based at least in part on a redundancy version index ($rv_{id}$), an LBRM index ($I_{LBRM}$), and an LBRM transport block size ($TBS_{LBRM}$).

The transmitter may select a number of coded bits per codeblock. The number of coded bits to be transmitted in a particular transmission (e.g., slot, PUSCH) for a codeblock index r is represented by $E_r$. There can be one or two different values for the number of coded bits per codeblock (e.g., the number of rate matched bits $E_r$ across a plurality of codeblocks could take a value X and/or a value Y per codeblock r, since it may not always be possible to divide available resources equally across all codeblocks). Codeblocks may be aligned to RE boundaries (for example, a single resource element carrying a particular modulation symbol may contain only bits corresponding to a single codeblock). G may represent the actual number of bits available for transmission (e.g., the total number of coded bits available for transmission of the transport block) for a single-slot transmission (that is, for a transmission occasion that occupies only one slot). C' may represent the number of codeblocks to be transmitted, wherein C' is according to a codeblock group transmission information (CBGTI) field if the CBGTI field is present in DCI, or is C (that is, all codeblocks) if the CBGTI field is not present. Bits may be selected (e.g., read) sequentially from the circular buffer. A starting position for a codeblock, $k_0$, may be determined by the redundancy version (RV). In the case of per segment rate matching or per slot rate matching, the starting position may be determined based at least in part on stored information, such as a last position from which the transmitter read a bit for a prior slot or segment. The number of bits read for a transport block is E, and the number of bits read for a given encoded bit sequence $e_{ri}$, is $E_r$, excluding filler bits.

In some aspects, per slot rate matching or per segment rate matching may be utilized. Further description is provided below. If per slot rate matching is used, G may be defined as the actual number of transmission bits available per slot, and $E_r$ may be defined as the number of coded bits of the rth codeblock to be transmitted in a given slot. If per segment rate matching is used, G may be defined as the actual number of transmission bits available per slot, and $E_r$ may be defined as the number of coded bits of the rth codeblock to be transmitted in a given segment.

At 350, the transmitter may perform interleaving to generate one or more interleaved encoded bit sequences $f_{ri}$. Recall that interleaving is performed on a per-codeblock basis (for each codeblock $c_{ri}$). In some cases, "interleaving" is referred to as "channel interleaving." In some aspects, the transmitter may perform row-column interleaving. In row-column interleaving, selected bits are arranged into a number of rows corresponding to the modulation order. Then, selected bits are read column-by-column, such that bits from each row are interleaved with each other. For redundancy version 0, the interleaver may be a systematic-bit priority interleaver, so that systematic bits are placed in higher reliability positions in a quadrature amplitude modulation (QAM) symbol. When binary phase shift keying (BPSK) is used, the interleaver may not affect the bit stream. At 355, the transmitter may perform codeblock concatenation on the encoded bit sequences $f_{ri}$, to generate a codeblock g, (which is distinct from the codeblock(s) $c_{ri}$).

After the codeblock has been generated, the transmitter may transmit the codeblock. For example, the transmitter may perform scrambling, modulation, layer mapping, antenna port mapping, mapping to one or more virtual resource blocks, and mapping from virtual resource blocks to physical resource blocks. Then, the transmitter may transmit a communication carrying an encoded transport block, which is based at least in part on the codeblock.

A receiver may receive the communication carrying the encoded transport block over the time-frequency resources assigned for this transmission occasion. The receiver estimates the channel using the demodulation reference signals transmitted along with the encoded bits. Using the estimated channel and the received signal, the receiver performs the demapping operation on each resource element of the received signal to obtain soft information regarding the bit values of the encoded transport block. Soft information may take the form of a log-likelihood ratio (such as a probability, based on the received signal, that a transmitted bit is a 0 or a 1). This probability could be quantized to a few levels (for example, 16 or 32 levels). In the extreme case that the probability is quantized to 2 levels, the soft information degenerates to "hard" information. For example, a two-level quantization of the probability may represent the receiver's best estimation as to what the transmitted bit was, with no further nuance on this guess.

The receiver may perform de-interleaving on the soft information to obtain de-interleaved soft information. The receiver may concatenate the de-interleaved soft information to obtain concatenated soft information. The receiver may decode the concatenated soft information to infer one or more codeblocks of the communication.

In some aspects, a TBoMS transmission triggered by a configured grant as described herein may utilize the uplink transmission coding chain described in association with FIG. 3.

As indicated above, FIG. 3 is provided as an example. Other examples may differ from what is described with regard to FIG. 3.

Figure 4:
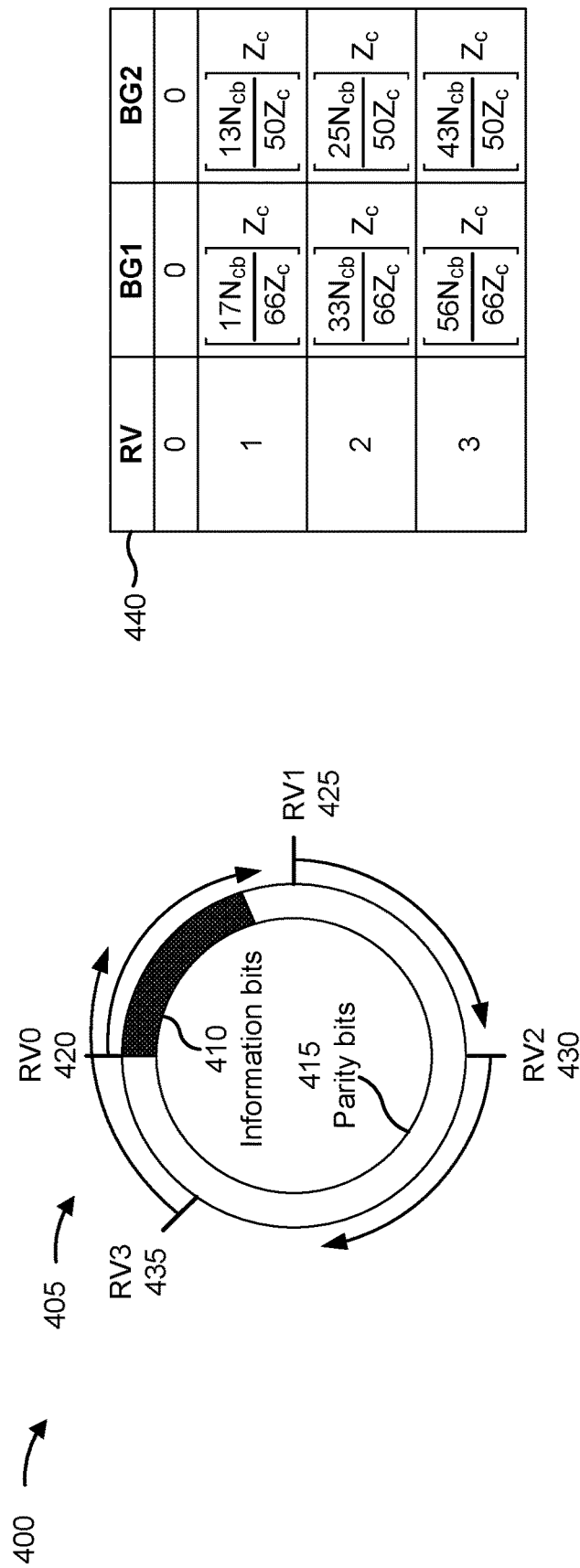
FIG. 4 is a diagram illustrating an example of redundancy version cycling based on uplink transmission occasions, in accordance with the present disclosure.

FIG. 4 is a diagram illustrating an example 400 of redundancy version cycling based on uplink transmission occasions, in accordance with the present disclosure. A UE 120 may apply redundancy version cycling to PUSCH repetitions to transmit different redundancy versions of the PUSCH repetition in different transmission occasions.

"Redundancy version" (RV) of a PUSCH repetition refers to a set of encoded bits that are transmitted for that PUSCH repetition. Using RV cycling, the UE 120 transmits a different set of encoded bits in different PUSCH repetitions. For example, the UE 120 may store bits for an uplink transmission in a circular buffer 405 (e.g., stored in memory of the UE 120). The circular buffer 405 stores information bits 410 (also referred to herein as systematic bits) and parity bits 415 (sometimes called parity-check bits). The information bits 410 may include the data to be transmitted, and the parity bits 415 may include linear combinations of the data (e.g., of the information bits 410). The UE 120 may encode information bits 410, parity bits 415, or a combination of information bits 410 and parity bits 415 into a set of encoded bits, and the UE 120 may transmit the set of encoded bits. The particular bits that are selected to be included in the set of encoded bits for a PUSCH repetition depend on (or are defined by) the RV of that PUSCH repetition.

As an example, the starting bit locations may be defined by a table 440, such as for NR hybrid automatic repeat request (HARQ) using LDPC code. The table 440 defines starting bit locations in the circular buffer 405 for a first base graph (BG1) and a second base graph (BG2). As described herein, a base graph is a parameter for determining parity bits 415 for a transmission based at least in part on a TBS and a code rate (with BG1 being intended for 113s with a larger TBS, and BG2 being intended for 113s with a smaller TBS). Referring to the table, Ncb represents the length of the circular buffer 405 (e.g., the number of bits included in the circular buffer 405), and Zc represents a lifting size, which is based at least in part on the number of information bits 410 and the number of BG columns corresponding to information bits 410.

In some examples, a base station 110 may transmit information, such as an RV index, to the UE 120. For example, the base station 110 may transmit the RV index for a PUSCH communication (e.g., a PUSCH transmission) in DCI that schedules the PUSCH communication. The RV index may indicate a sequence of RVs to be applied to a corresponding sequence of PUSCH transmission occasions (e.g., PUSCH opportunities). The UE 120 may increment a counter n (sometimes called an index n) for each uplink transmission occasion following (or indicated by) the DCI. The UE 120 may use the information transmitted by the base station 110 (e.g., the RV index) and the value of the counter n for a particular transmission occasion to determine an RV to be applied to that transmission occasion.

For example, as shown by table 445, for PUSCH Repetition Type A, if the base station 110 indicates an RV index of 0, then the UE 120 may determine an RV to be applied to an nth transmission occasion (e.g., for PUSCH Repetition Type A) by calculating n mod 4, where mod represents a modulo operation. If n mod 4=0 (e.g., for transmission occasion 0), then the UE 120 applies RV0 to that transmission occasion. If n mod 4=1 (e.g., for transmission occasion 1), then the UE 120 applies RV2 to that transmission occasion. If n mod 4=2 (e.g., for transmission occasion 2), then the UE 120 applies RV3 to that transmission occasion. If n mod 4=3 (e.g., for transmission occasion 3), then the UE 120 applies RV1 to that transmission occasion. As shown, the RV index may have a value of 0, 1, 2, or 3, each of which corresponds to a different sequence of RVs (e.g., a different order for RV0, RV1, RV2, and RV3).

Similarly, for PUSCH Repetition Type B, if the base station 110 indicates an RV index of 0, then the UE 120 may determine an RV to be applied to an nth actual repetition (e.g., of PUSCH Repetition Type B) by calculating n mod 4, where mod represents a modulo operation. If n mod 4=0 (e.g., for actual repetition 0), then the UE 120 applies RV0 to that actual repetition. If n mod 4=1 (e.g., for actual repetition 1), then the UE 120 applies RV2 to that actual repetition. If n mod 4=2 (e.g., for actual repetition 2), then the UE 120 applies RV3 to that actual repetitions. If n mod 4=3 (e.g., for actual repetition 3), then the UE 120 applies RV1 to that actual repetition.

In some aspects, a TBoMS transmission triggered by a configured grant as described herein may utilize RV cycling as described in association with FIG. 4.

As indicated above, FIG. 4 is provided as an example. Other examples may differ from what is described with respect to FIG. 4. For example, the RV cycling technique shown in table 445 is one example of an RV cycling technique, and other RV cycling techniques may be used.

Figure 5:
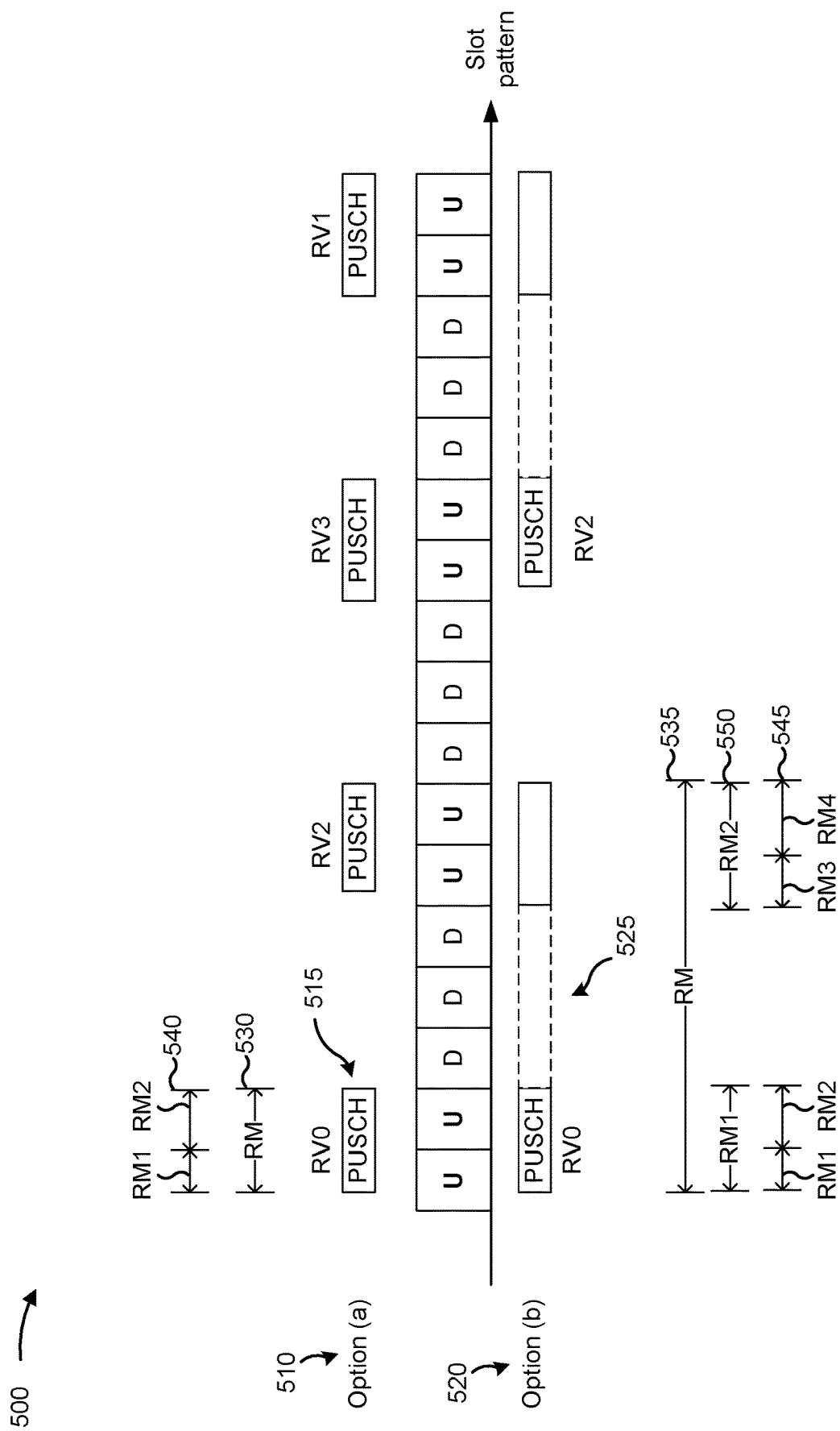
FIG. 5 is a diagram illustrating an example of multi-slot uplink shared channel transmission, in accordance with the present disclosure.

FIG. 5 is a diagram illustrating an example 500 of multi-slot uplink shared channel transmission in accordance with the present disclosure. Slots are labeled as "U," indicating an uplink slot (that is, a slot with a threshold number of configured or indicated uplink symbols), or "D," indicating a downlink slot (that is, a slot with a threshold number of configured or indicated downlink symbols). Two options are depicted for a UE to transmit PUSCH repetitions over a set of contiguous time domain resources, where the PUSCH repetitions span multiple slots and/or multiple segments, as described in further detail herein. PUSCH repetitions that span multiple slots or multiple segments may be referred to herein as TBoMS transmissions or multi-slot PUSCH transmissions. Although techniques are described herein in connection with TBoMS transmissions, these techniques can be applied to various types of uplink repetitions, such as an uplink data repetition, an uplink control repetition (such as physical uplink control channel (PUCCH) repetition), or the like.

A repetition, such as an uplink repetition or a downlink repetition, may be used to improve reliability, such as for ultra reliable low latency communication (URLLC) or for UEs located in a geographic area with poor channel conditions (such as a cell edge). When repetitions are used, a transmitter repeats transmission of a communication multiple times. For example, a UE may transmit an initial uplink communication and may repeat transmission of (that is, may retransmit) that uplink communication one or more times. Each repetition may include different encoded bits in accordance with different RVs, as described herein. Therefore, a receiver can attempt to combine multiple repetitions to improve the likelihood of successfully decoding a payload of the multiple repetitions.

As used herein, the term "repetition" is used to refer to the initial communication and is also used to refer to a repeated transmission of the initial communication. For example, if a UE is configured to transmit four repetitions, then the UE may transmit an initial transmission and may transmit three repeated transmissions of that initial transmission. Thus, each transmission (regardless of whether the transmission is an initial transmission or a retransmission) is counted as a repetition. A repetition may be transmitted in a transmission occasion, which is sometimes referred to as a transmission instance. In these examples, a transmission occasion is a multi-slot transmission occasion, which facilitates the transmission of TBoMS transmissions.

For a first type of TBoMS transmission, shown at 510 and referred to as Option (a), each repetition and each multi-slot transmission occasion spans a set of contiguous resources (such as symbols or slots). Option (a) may enable, for example, a UE to transmit a transport block, spanning a set of contiguous slots, in a single transmission occasion. For example, for a first TBoMS transmission 515 that includes a codeblock associated with RV0, the repetition is shown spanning a set of two contiguous slots. As used herein "spanning across a set of contiguous slots" means "including at least one symbol of each slot of the set of contiguous slots."

For a second type of TBoMS transmission, shown at 520 and referred to as Option (b), each repetition spans two or more segments, and a segment includes a set of contiguous slots. Option (b) may enable, for example, a UE to transmit a transport block, spanning multiple sets of contiguous slots, in a single transmission occasion. For example, for a second TBoMS transmission 525 that includes a codeblock associated with RV0, the repetition is shown spanning two sets of contiguous slots. Thus, the repetition is transmitted on two segments of the transmission occasion, where a first segment occupies at least part of the first and second slots of the slot pattern, and a second segment occupies at least part of the sixth and seventh slots of the slot pattern.

In some aspects, RV cycling may be performed on a per slot basis. For example, each slot of a multi slot transmission occasion may be assigned a respective RV index. In some aspects, RV cycling may be performed on a per transmission occasion basis. For example, each transmission occasion may be assigned a respective RV index. In some aspects, RV cycling may be performed on a per segment basis. For example, each segment of a transmission occasion may be assigned a respective RV index.

In some aspects, rate matching (shown as "RM") may be performed on a per transmission occasion basis. Per transmission occasion rate matching is shown by reference number 530 for option (a) and reference number 535 for option (b). In other aspects, rate matching may be performed on a per slot basis. For option (a), shown by reference number 540, first rate matching may be performed for a first slot of a transmission occasion and second rate matching may be performed for a second slot of a transmission occasion. For option (b), shown by reference number 545, respective rate matching may be performed for each slot of a transmission occasion (that is, twice for the two slots of the first segment and twice for the two slots of the second segment). In yet other aspects, as shown by reference number 550, rate matching may be performed on a per segment basis.

In some aspects, a TBoMS transmission triggered by a configured grant as described herein may utilize the techniques for multi-slot uplink shared channel transmission described in association with FIG. 5.

As indicated above, FIG. 5 is provided as an example. Other examples may differ from what is described with respect to FIG. 5.

Figure 6:
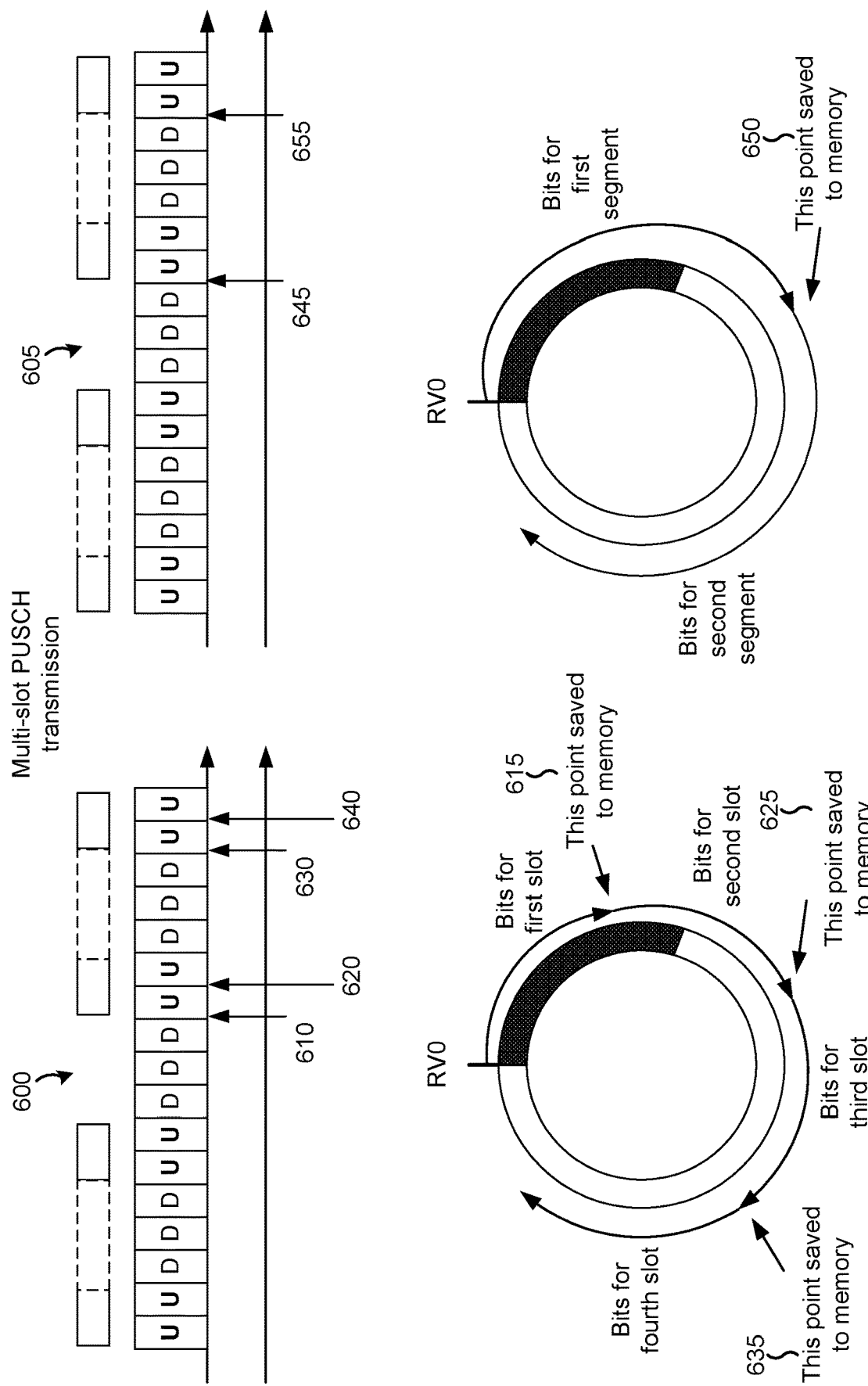
FIG. 6 is a diagram illustrating examples of circular buffer reading and bit selection for per slot and per segment rate matching, in accordance with the present disclosure.

FIG. 6 is a diagram illustrating examples of circular buffer reading and bit selection for per slot and per segment rate matching, in accordance with the present disclosure.

As shown in FIG. 6, example 600 depicts per slot rate matching for option (b) illustrated in FIG. 5. As shown, the UE may determine parameters for rate matching for a first slot of the first segment 610, and the UE may identify and read rate matching bits from the circular buffer (starting at the starting position indicated by the RV index) in accordance with the parameters for rate matching for the first slot of the first segment 610. The UE may save (e.g., to memory) a first point 615 in the circular buffer at which the UE ceases reading the rate matching bits for the first slot of the first segment 610. Then, the UE may determine parameters for rate matching for a second slot of the first segment 620, and the UE may identify and read rate matching bits from the circular buffer in accordance with the parameters for rate matching for the second slot of the first segment 620 starting at the first point 615 in the circular buffer. The UE may save (e.g., to memory) a second point 625 in the circular buffer at which the UE ceases reading the rate matching bits for the second slot of the first segment 620. The UE may determine parameters for rate matching for a first slot of the second segment 630 and may identify and read rate matching bits from the circular buffer (starting at the second point 625) in accordance with the parameters for rate matching for the first slot of the second segment 630. The UE may save (e.g., to memory) a third point 635 in the circular buffer at which the UE ceases reading the rate matching bits for the first slot of the second segment 630. Then, the UE may determine parameters for rate matching for a second slot of the second segment 640 and may identify and read rate matching bits from the circular buffer in accordance with the parameters for rate matching for the second slot of the second segment 640 starting at the third point 635 in the circular buffer. For example, the UE may read only bits consumed in a given slot for rate matching of the given slot.

In some aspects, the UE may perform per slot rate matching with RV cycling. For example, consider a TBoMS transmission occasion with four non-contiguous segments of two slots each. The UE may perform per slot rate matching and interleaving (as described above) for each of a plurality of first slots (such as each slot of a first N segments of the four segments) using a first RV index. The UE may then perform per slot rate matching and interleaving for each of a plurality of second slots (such as each slot of a remainder of the four segments) using a second RV index. In some aspects, the plurality of first slots may be based at least in part on a sequence of slots, such as information indicating a number of slots for which the per slot rate matching is to be performed before moving to a next RV index in an RV cycle.

Example 605 depicts per segment rate matching for option (b) illustrated in FIG. 5. As shown, the UE may determine parameters for rate matching for a first segment 645, and the UE may identify and read rate matching bits from the circular buffer (starting at the starting position indicated by the RV index) in accordance with the parameters for rate matching for the first segment 645. The UE may save (e.g., to memory) a point 650 in the circular buffer at which the UE ceases reading the rate matching bits for the first segment 645. Then, the UE may determine parameters for rate matching for a second segment 655, and the UE may identify and read rate matching bits from the circular buffer in accordance with the parameters for rate matching for the second segment 655 starting at the point 650 in the circular buffer that was saved by the UE. For example, the UE may read bits consumed in the first segment 645 from the circular buffer, then may read bits consumed in the second segment 655 from the circular buffer. Thus, per segment rate matching is enabled.

In some aspects, rate matching may be performed across a TBoMS transmission occasion (e.g., for both segments and all four slots). In this situation, the UE may perform steps similar to those described for per segment rate matching, but without the stopping and saving at the point 650 in the circular buffer and instead reading the entire circular buffer.

In some aspects, a TBoMS transmission triggered by a configured grant as described herein may utilize the circular buffer reading and bit selection techniques described in association with FIG. 6.

As indicated above, FIG. 6 is provided as an example. Other examples may differ from what is described with respect to FIG. 6.

In some scenarios, an uplink transmission (e.g., a PUSCH transmission, a TBoMS transmission, or the like) can be triggered by a configured grant. In general, a configuration for a configured grant is provided to a UE via one or more radio resource control (RRC) parameters. That is, the configured grant is (semi-statically) configured without a need for DCI. One characteristic of configured grants is that it is never guaranteed that the UE will make use of resources associated with the grant. Rather, the resources of the configured grant are presented as an opportunity for the UE to transmit bits in a buffer without a need to request resources from a base station. Thus, at some transmission occasions defined by a configured grant, the UE may have no buffered data in need of transmission. In such a scenario, the UE may take no action at the transmission occasion of the configured grant.

In one particular example, a configured grant may be configured to enable Type A PUSCH repetitions. For example, a configured grant may be configured to have a periodicity of 10 milliseconds (ms), and there may be 20 slots in a given 10 ms period. Here, a transmission occasion for the configured grant may occur every 20 slots and may be configured to permit the UE to transmit up to eight repetitions. In this example, the UE has the opportunity to transmit every 20 slots, and if the UE uses the configured grant resource in any interval where the UE has data ready for transmission, then the UE is presented with an opportunity to transmit across eight slots within the 20-slot interval. Here, each of the eight slots would correspond to one of eight repetitions associated with the configured grant. In this example, if data is ready for transmission by the UE at a first repetition associated with the configured grant, then the UE starts transmission at the first repetition and transmits all eight repetitions (e.g., one in each slot). However, in some scenarios, the data may not be ready for transmission by the UE until a point in time after one or more of the repetitions have passed (e.g., when data arrives from a higher layer after one or more of the eight repetitions have passed). In such a scenario, for PUSCH Type A repetitions, the UE is configured to operate in accordance with a set of defined rules in order to determine where an initial transmission of a transport block may begin.

The set of defined rules associated with Type A PUSCH repetitions state that, if a configured grant configuration is configured with a parameter startingFromRV0 set to "off," then the initial transmission of a transport block may only start at the first transmission occasion of the K repetitions (K≥1). Otherwise, the initial transmission of a transport block may start at: (1) the first transmission occasion of the K repetitions if a configured RV sequence is {0,2,3,1}, (2) any of the transmission occasions of the K repetitions that are associated with RV index 0 if the configured RV sequence is {0,3,0,3}, or (3) any of the transmission occasions of the K repetitions if the configured RV sequence is {0,0,0,0}, except the last transmission occasion when K≥8.

As indicated above, a TBoMS transmission (also referred to as a TBoMS repetition or RV bundle) is defined such that the TBoMS transmission is not constrained to a single slot. That is, a TBoMS transmission may include one of more repetitions of a transport block, and each repetition (also referred to as a single TBoMS) can span multiple slots. Therefore, the above-described rules are insufficient to enable identification of a transmission occasion for an initial transmission of a TBoMS transmission triggered by a configured grant. For example, a rule stating that a first transmission occasion of the K repetitions is to be used for an initial transmission occasion for a TBoMS triggered by a configured grant is insufficient because, while there are K slots on which the UE can transmit, the repetition framework operates across multiple slots, and so every repetition is associated with multiple slots.

Some aspects described herein provide techniques and apparatuses that enable an initial transmission of a TBoMS transmission triggered by a configured grant. In some aspects, a UE may identify a transmission occasion at which to start an initial transmission of a TBoMS transmission triggered by a configured grant. In some aspects, the transmission occasion corresponds to a single slot of the TBoMS transmission, and the transmission occasion is identified as one of a first transmission occasion of a first repetition of a set of repetitions, or a first transmission occasion of any repetition of the set of repetitions. In some aspects, the transmission occasion corresponds to all slots of one repetition of the TBoMS transmission (e.g., the TBoMS transmission being configured with one or more repetitions), and the transmission occasion is identified as one of: a first transmission occasion of a set of repetitions, or any transmission occasion of the set of repetitions. In some aspects, the UE may transmit the initial transmission of the TBoMS transmission based at least in part on the transmission occasion. Additional details are provided below.

Figure 7:
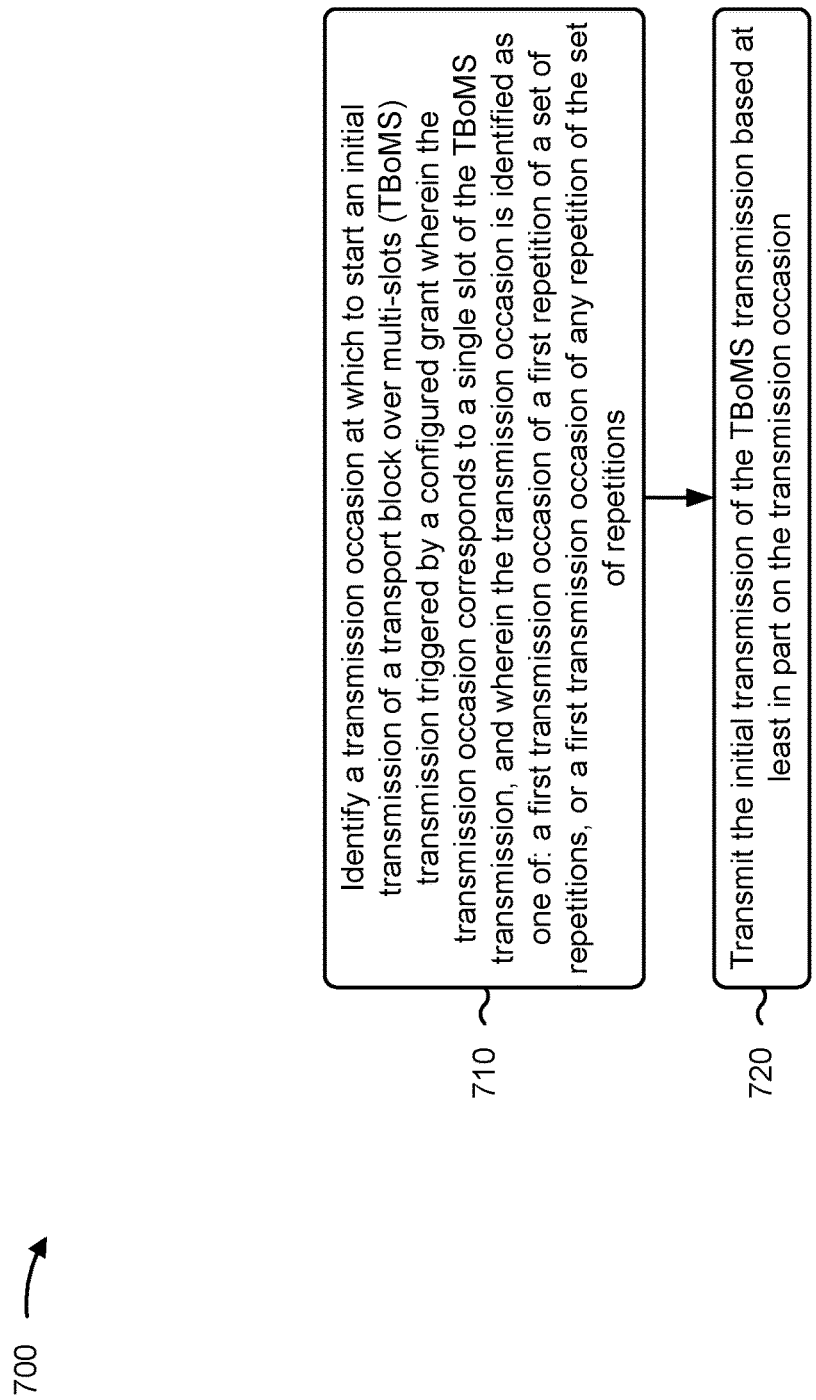
FIGS. 7 and 8 are flowcharts of example methods of wireless communication, in accordance with the present disclosure.

FIG. 7 is a flowchart of an example method 700 of wireless communication. The method 700 may be performed by, for example, a UE (e.g., UE 120).

At 710, the UE may identify a transmission occasion at which to start an initial transmission of a TBoMS transmission triggered by a configured grant. For example, the UE (e.g., using communication manager 140 and/or identification component 908, depicted in FIG. 9) may identify a transmission occasion at which to start an initial transmission of a TBoMS transmission triggered by a configured grant, wherein the transmission occasion corresponds to a single slot of the TBoMS transmission, and wherein the transmission occasion is identified as one of: a first transmission occasion of a first repetition of a set of repetitions, or a first transmission occasion of any repetition of the set of repetitions, as described herein.

In some aspects, the transmission occasion is identified as the first transmission occasion of the first repetition based at least in part on an RV sequence configured for the UE being {0,2,3,1}.

In some aspects, alone or in combination with the first aspect, the transmission occasion is identified as the first transmission occasion of any repetition based at least in part on the repetition being associated with RV index 0.

In some aspects, alone or in combination with one or more of the first and second aspects, the transmission occasion is identified as the first transmission occasion of any repetition further based at least in part on an RV sequence configured for the UE being {0,3,0,3}.

In some aspects, alone or in combination with one or more of the first through third aspects, the transmission occasion is identified as the first transmission occasion of any repetition based at least in part on an RV sequence configured for the UE being {0,0,0,0}.

In some aspects, alone or in combination with one or more of the first through fourth aspects, the transmission occasion is identified as the first transmission occasion of any repetition other than a last repetition of the set of repetitions when the set of repetitions includes eight or more repetitions.

In some aspects, alone or in combination with one or more of the first through fifth aspects, the transmission occasion is identified as the first transmission occasion of the first repetition based at least in part on a starting RV parameter used for Type A PUSCH repetitions being set to "off."

In some aspects, alone or in combination with one or more of the first through sixth aspects, the transmission occasion is identified as the first transmission occasion of the first repetition based at least in part on a starting RV parameter used for TBoMS transmissions being set to "off."

In some aspects, alone or in combination with one or more of the first through seventh aspects, the transmission occasion is identified as the first transmission occasion of the first repetition irrespective of any RRC parameters.

In some aspects, alone or in combination with one or more of the first through eighth aspects, the transmission occasion is identified as the first transmission occasion of any repetition associated with RV index 0 irrespective of any RRC parameters.

At 720, the UE may transmit the initial transmission of the TBoMS transmission based at least in part on the transmission occasion. For example, the UE (e.g., using communication manager 140 and/or transmission component 904, depicted in FIG. 9) may transmit the initial transmission of the TBoMS transmission based at least in part on the transmission occasion, as described herein.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
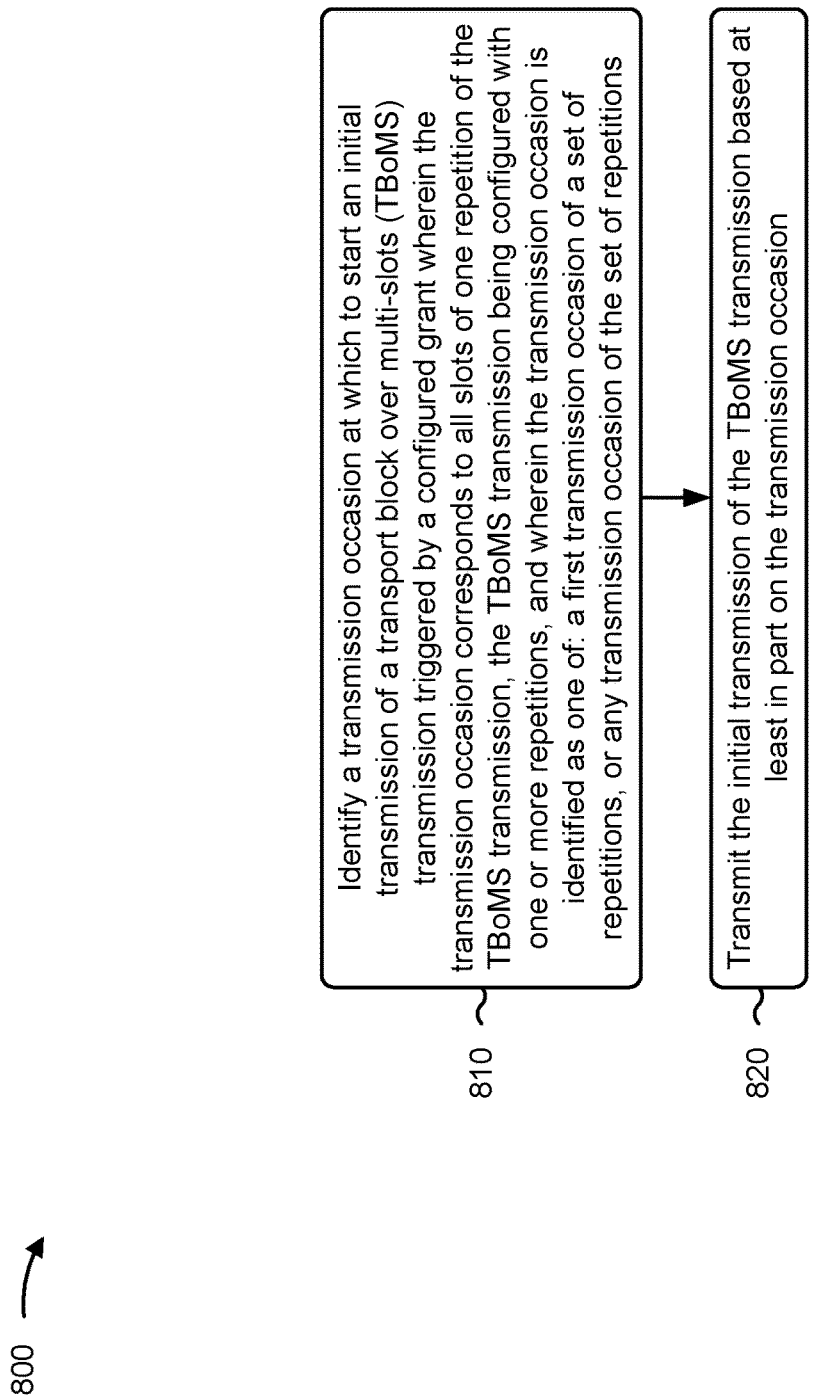

FIG. 8 is a flowchart of an example method 800 of wireless communication. The method 800 may be performed by, for example, a UE (e.g., UE 120).

At 810, the UE may identify a transmission occasion at which to start an initial transmission of a TBoMS transmission triggered by a configured grant. For example, the UE (e.g., using communication manager 140 and/or identification component 908, depicted in FIG. 9) may identify a transmission occasion at which to start an initial transmission of a TBoMS transmission triggered by a configured grant, wherein the transmission occasion corresponds to all slots of one repetition of the TBoMS transmission, the TBoMS transmission being configured with one or more repetitions, and wherein the transmission occasion is identified as one of: a first transmission occasion of a set of repetitions, or any transmission occasion of the set of repetitions, as described herein.

In some aspects, the transmission occasion is identified as the first transmission occasion of the set of repetitions based at least in part on an RV sequence configured for the UE being {0,2,3,1}.

In some aspects, alone or in combination with the first aspect, the transmission occasion is identified as any transmission occasion of the set of repetitions based at least in part on the transmission occasion being associated with RV index 0.

In some aspects, alone or in combination with one or more of the first and second aspects, the transmission occasion is identified as the any transmission occasion of the set of repetitions further based at least in part on an RV sequence configured for the UE being {0,3,0,3}.

In some aspects, alone or in combination with one or more of the first through third aspects, the transmission occasion is identified as any transmission occasion of the set of repetitions based at least in part on an RV sequence configured for the UE being {0,0,0,0}.

In some aspects, alone or in combination with one or more of the first through fourth aspects, the transmission occasion is identified as any transmission occasion of the set of repetitions other than a last transmission occasion of the set of repetitions when the set of repetitions includes eight more repetitions.

In some aspects, alone or in combination with one or more of the first through fifth aspects, the transmission occasion is identified as the first transmission occasion based at least in part on a starting RV parameter used for Type A PUSCH repetitions being set to "off."

In some aspects, alone or in combination with one or more of the first through sixth aspects, the transmission occasion is identified as the first transmission occasion based at least in part on a starting RV parameter used for TBoMS transmissions being set to "off."

In some aspects, alone or in combination with one or more of the first through seventh aspects, the transmission occasion is identified as the first transmission occasion irrespective of any RRC parameters.

In some aspects, alone or in combination with one or more of the first through eighth aspects, the transmission occasion is identified as any transmission occasion of the set of repetitions associated with RV index 0 irrespective of any RRC parameters.

At 820, the UE may transmit the initial transmission of the TBoMS transmission based at least in part on the transmission occasion. For example, the UE (e.g., using communication manager 140 and/or transmission component 904, depicted in FIG. 9) may transmit the initial transmission of the TBoMS transmission based at least in part on the transmission occasion, as described herein.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
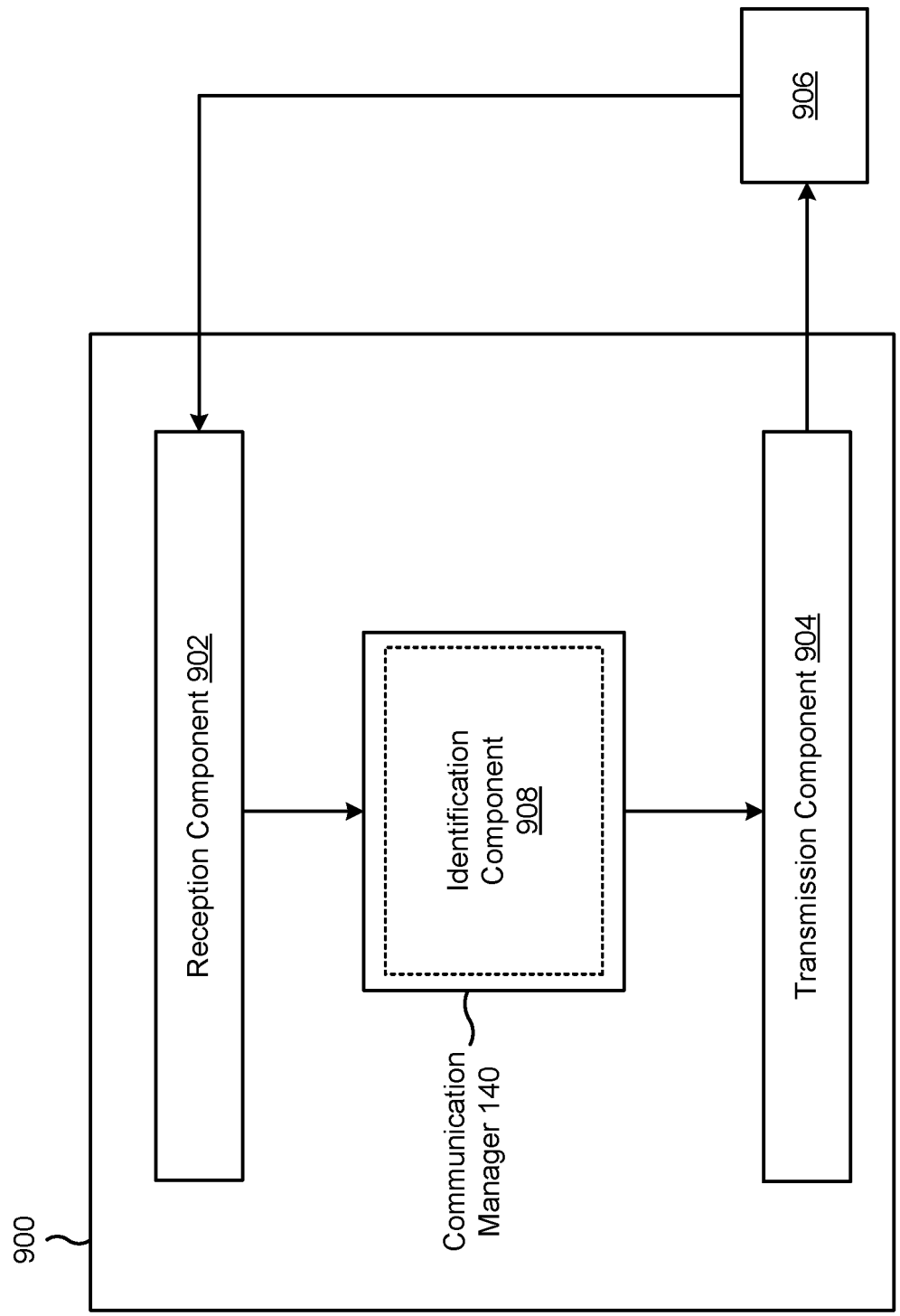
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include an identification component 908, among other examples.

In some aspects, the apparatus 900 may be configured to perform one or more operations described herein. Additionally, or alternatively, the apparatus 900 may be configured to perform one or more processes described herein, such as method 700 of FIG. 7, method 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

In some aspects, the identification component 908 may identify a transmission occasion at which to start an initial transmission of a TBoMS transmission triggered by a configured grant wherein the transmission occasion corresponds to a single slot of the TBoMS transmission, and wherein the transmission occasion is identified as one of: a first transmission occasion of a set of repetitions, or a first transmission occasion of any repetition of the set of repetitions. In some aspects, the transmission component 904 may transmit the initial transmission of the TBoMS transmission based at least in part on the transmission occasion.

In some aspects, the identification component 908 may identify a transmission occasion at which to start an initial transmission of a TBoMS transmission triggered by a configured grant wherein the transmission occasion corresponds to all slots of one repetition of the TBoMS transmission, the TBoMS transmission being configured with one or more repetitions, and wherein the transmission occasion is identified as one of: a first transmission occasion of a set of repetitions, or any transmission occasion of the set of repetitions. In some aspects, the transmission component 904 may transmit the initial transmission of the TBoMS transmission based at least in part on the transmission occasion.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
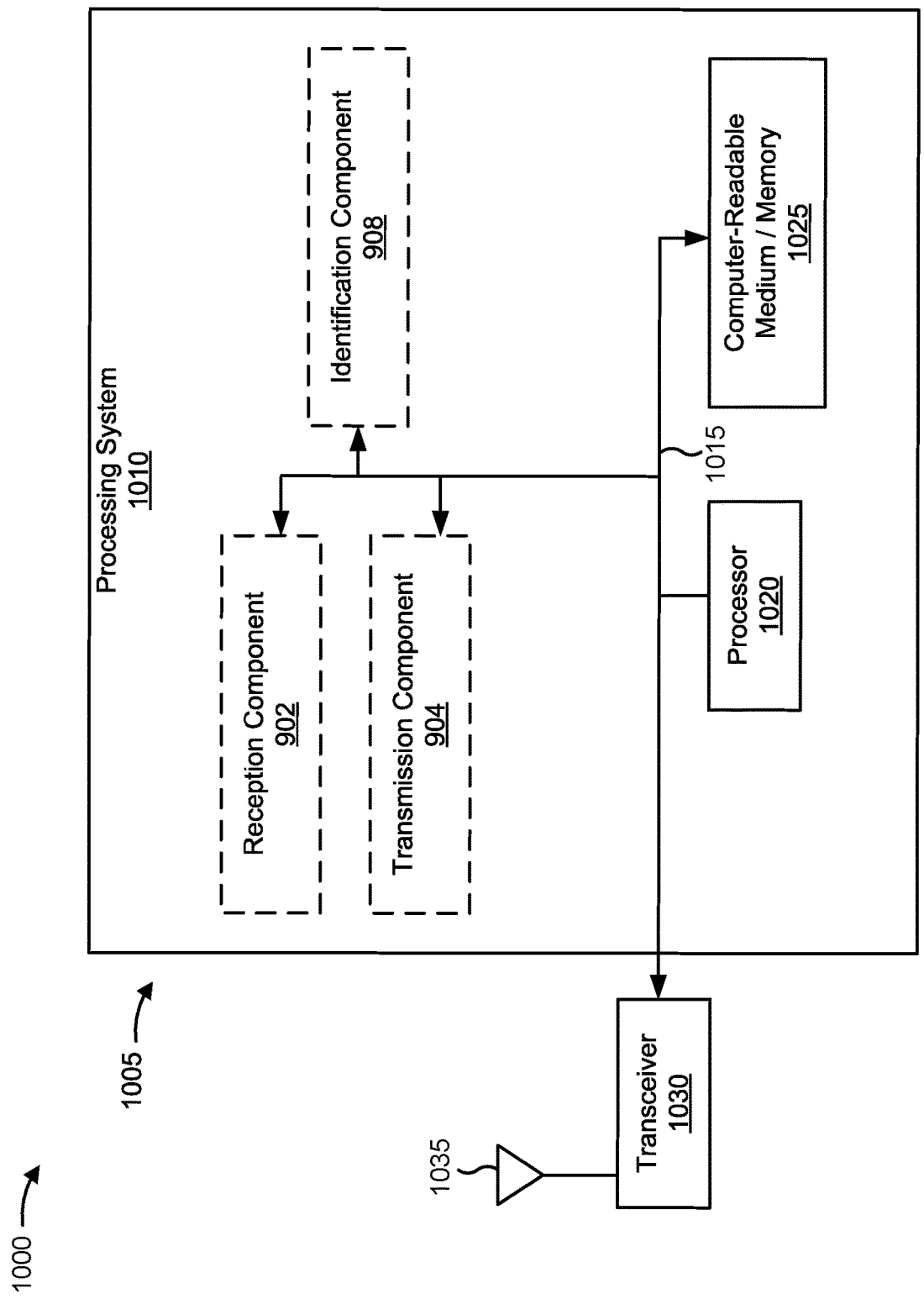
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, and/or power management circuits.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer-readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for identifying a transmission occasion at which to start an initial transmission of a TBoMS transmission triggered by a configured grant, wherein the transmission occasion corresponds to a single slot of the TBoMS transmission, and wherein the transmission occasion is identified as one of: a first transmission occasion of a first repetition of a set of repetitions, or a first transmission occasion of any repetition of the set of repetitions; and means for transmitting the initial transmission of the TBoMS transmission based at least in part on the transmission occasion. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for identifying a transmission occasion at which to start an initial transmission of a TBoMS transmission triggered by a configured grant, wherein the transmission occasion corresponds to all slots of one repetition of the TBoMS transmission, the TBoMS transmission being configured with one or more repetitions, and wherein the transmission occasion is identified as one of: a first transmission occasion of a set of repetitions, or any transmission occasion of the set of repetitions; and means for transmitting the initial transmission of the TBoMS transmission based at least in part on the transmission occasion. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11A:
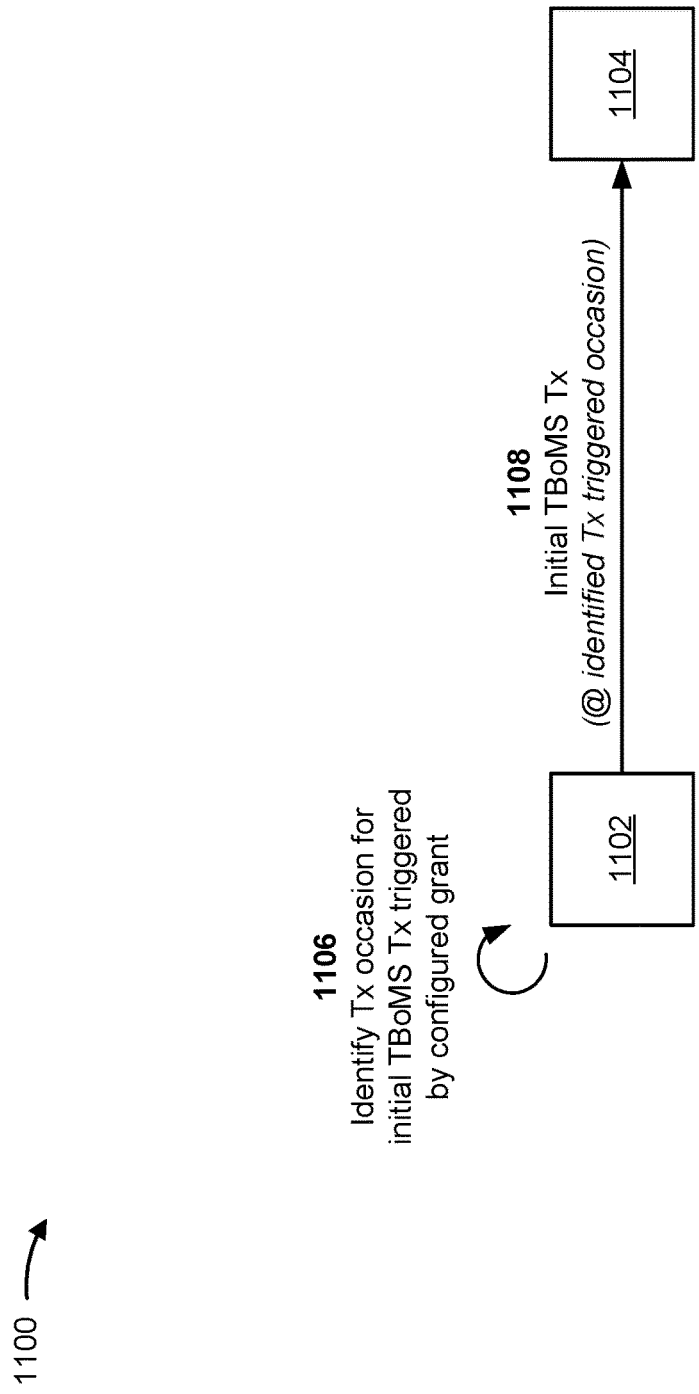
FIGS. 11A and 11B are diagrams illustrating an example associated with an initial transmission of a transport block over multi-slots (TBoMS) transmission triggered by a configured grant, in accordance with the present disclosure.
Figure 11B:
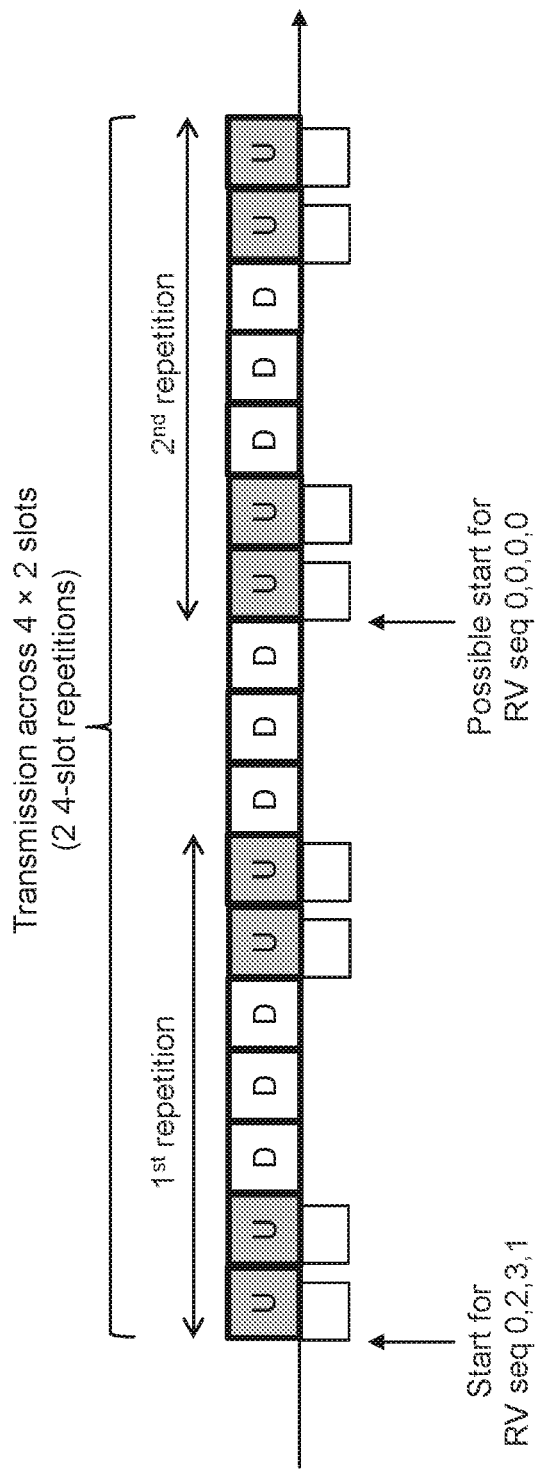

FIGS. 11A and 11B are diagrams illustrating an example 1100 associated with an initial transmission of a TBoMS transmission triggered by a configured grant, in accordance with the present disclosure. As shown in FIG. 11A, example 1100 includes communication between an apparatus 1102 and an apparatus 1104. In some aspects, the apparatus 1102 may include, for example, a UE 120, an apparatus 900, an apparatus 1005, or another wireless communication device described herein. In some aspects, the apparatus 1104 may include, for example, a base station 110 or another wireless communication device described herein. In some aspects, the apparatus 1102 and the apparatus 1104 may be included in a wireless network, such as wireless network 100. The apparatus 1102 and the apparatus 1104 may communicate via a wireless access link, which may include an uplink and a downlink.

As shown in FIG. 11A by reference 1106, the apparatus 1102 may identify a transmission occasion at which to start an initial transmission of a TBoMS transmission triggered by a configured grant. As described above, a TBoMS transmission may include one or more repetitions of a transport block, with each repetition spanning one or more slots.

In some aspects, the transmission occasion corresponds to a single slot of the TBoMS transmission. That is, in some aspects, a transmission occasion for a TBoMS transmission may in some aspects be defined as one slot of a TBoMS repetition. Put another way, in some aspects, a transmission occasion corresponds to a single slot of a TBoMS transmission (rather than multiple slots of the TBoMS transmission).

In some aspects, when a transmission occasion corresponds to a single slot of a TBoMS transmission, the apparatus 1102 may be configured to identify the transmission occasion for the TBoMS as a first transmission occasion of a first repetition of a set of repetitions. In some aspects, the first repetition is a first occurring repetition, of a set of repetitions, in the time domain.

In some aspects, the apparatus 1102 may be configured to identify the transmission occasion as the first transmission occasion of the first repetition based at least in part on an RV sequence configured for the apparatus 1102 being {0,2,3,1}. That is, in some aspects when a transmission occasion corresponds to a single slot of a TBoMS transmission, the apparatus 1102 may identify the transmission occasion at which to start an initial transmission of the TBoMS transmission as the first transmission occasion of the first (e.g., first occurring in the time domain) repetition if the configured RV sequence is {0,2,3,1}. As one particular example, with reference to FIG. 11B, the TBoMS transmission may include two four-slot repetitions (e.g., K=2), with each repetition being transmitted in two pairs of slots (e.g., such that the transmission occurs over four separate pairs of slots). In this example, if the configured RV sequence is at the apparatus 1102 is {0,2,3,1}, then the apparatus 1102 may identify the transmission occasion at which to start the initial transmission of the TBoMS transmission as the first transmission occasion of the first repetition (e.g., the first occurring slot in the time domain in FIG. 11B).

In some aspects, the apparatus 1102 may be configured to identify the transmission occasion as the first transmission occasion of the first repetition based at least in part on a starting RV parameter used for Type A PUSCH repetitions being set to "off." For example, in some aspects, a higher layer parameter (e.g., startingFromRV0) used for Type A PUSCH repetitions may be reused for TBoMS transmission. Thus, in some aspects, if the higher layer parameter used for Type A PUSCH repetitions is set to "off", then the apparatus 1102 may be configured such that the initial transmission of the TBoMS transmission can start only at the first transmission occasion of the first repetition.

In some aspects, the apparatus 1102 may be configured to identify the transmission occasion as the first transmission occasion of the first repetition based at least in part on a starting RV parameter used for TBoMS transmissions being set to "off." For example, in some aspects, a particular higher layer parameter (e.g., startingFromRV0-TBoMS) may be is used for TBoMS transmissions. Thus, in some aspects, if the higher layer parameter used for TBoMS transmissions is set to "off", then the apparatus 1102 may be configured such that the initial transmission of the TBoMS transmission can start only at the first transmission occasion of the first repetition.

In some aspects, the apparatus 1102 may be configured to identify the transmission occasion as the first transmission occasion of the first repetition as the first transmission occasion of the first repetition irrespective of any RRC parameters. That is, in some aspects, the apparatus 1102 may be configured such that the initial transmission of the TBoMS transmission may start only at the first transmission occasion of the first repetition, irrespective of any RRC parameters.

Alternatively, when a transmission occasion corresponds to a single slot of a TBoMS transmission, the apparatus 1102 may in some aspects be configured to identify the transmission occasion as a first transmission occasion of any repetition of the set of repetitions.

In some aspects, the apparatus 1102 may be configured to identify the transmission occasion as the first transmission occasion of any repetition based at least in part on the repetition being associated with an RV index 0. For example, in some aspects when a transmission occasion corresponds to a single slot of a TBoMS transmission, the apparatus 1102 may identify the transmission occasion at which to start an initial transmission of the TBoMS transmission as the first transmission occasion of any of K repetitions that are associated with RV index 0 if the configured RV sequence is {0,3,0,3}.

As another example, in some aspects when a transmission occasion corresponds to a single slot of a TBoMS transmission, the apparatus 1102 may identify the transmission occasion at which to start an initial transmission of the TBoMS transmission as the first transmission occasion of any of K repetitions that are associated with RV index 0 if the configured RV sequence is {0,0,0,0}. In some aspects, the apparatus 1102 may identify the transmission occasion as the first transmission occasion of any of K repetitions that are associated with RV index 0 if the configured RV sequence is {0,0,0,0}, except the last repetition (e.g., the latest occurring repetition in the time domain) when the set of repetitions includes eight or more repetitions (e.g., when K≥8). As one particular example, with reference to FIG. 11B, the TBoMS transmission may include two four-slot repetitions (e.g., K=2), with each repetition being transmitted in two pairs of slots (e.g., such that the transmission occurs over four separate pairs of slots). In this example, if the configured RV sequence is at the apparatus 1102 is {0,0,0,0}, then the apparatus 1102 may identify the transmission occasion at which to start the initial transmission of the TBoMS transmission as the first transmission occasion of the second repetition (e.g., the eleventh occurring slot in the time domain in FIG. 11B). Notably, in this example, the repetition identified by the apparatus 1102 is the last repetition, which in some aspects may be permitted since there are fewer than eight repetitions (e.g., K=2≤8).

In some aspects, the apparatus 1102 may be configured to identify the transmission occasion as the first transmission occasion of any repetition associated with RV index 0 irrespective of any RRC parameters. That is, in some aspects, the apparatus 1102 may be configured such that the initial transmission of the TBoMS transmission can start only at the first transmission occasion of any repetition associated with RV index 0, irrespective of any RRC parameters.

As shown by reference 1108, the apparatus 1102 may transmit the initial transmission of the TBoMS transmission based at least in part on the transmission occasion. For example, the apparatus 1102 may transmit, to the apparatus 1104, the initial transmission of the TBoMS transmission in the identified transmission occasion. As indicated above, FIGS. 11A and 11B are provided as examples. Other examples may differ from what is described with respect to FIGS. 11A and 11B.

The following provides an overview of some Aspects of the present disclosure:

Aspect 1: A method of wireless communication performed by a UE, comprising: identifying a transmission occasion at which to start an initial transmission of a TBoMS transmission triggered by a configured grant, wherein the transmission occasion corresponds to a single slot of the TBoMS transmission, and wherein the transmission occasion is identified as one of: a first transmission occasion of a first repetition of a set of repetitions, or a first transmission occasion of any repetition of the set of repetitions; and transmitting the initial transmission of the TBoMS transmission based at least in part on the transmission occasion.

Aspect 2: The method of Aspect 1, wherein the transmission occasion is identified as the first transmission occasion of the first repetition based at least in part on an RV sequence configured for the UE being {0,2,3,1}.

Aspect 3: The method of any of Aspects 1-2, wherein the transmission occasion is identified as the first transmission occasion of any repetition based at least in part on the repetition being associated with RV index 0.

Aspect 4: The method of Aspect 3, wherein the transmission occasion is identified as the first transmission occasion of any repetition further based at least in part on an RV sequence configured for the UE being {0,3,0,3}.

Aspect 5: The method of any of Aspects 3-4, wherein the transmission occasion is identified as the first transmission occasion of any repetition based at least in part on an RV sequence configured for the UE being {0,0,0,0}.

Aspect 6: The method of Aspect 5, wherein the transmission occasion is identified as the first transmission occasion of any repetition other than a last repetition of the set of repetitions when the set of repetitions includes eight or more repetitions.

Aspect 7: The method of any of Aspects 1-6, wherein the transmission occasion is identified as the first transmission occasion of the first repetition based at least in part on a starting RV parameter used for Type A PUSCH repetitions being set to "off."

Aspect 8: The method of any of Aspects 1-7, wherein the transmission occasion is identified as the first transmission occasion of the first repetition based at least in part on a starting RV parameter used for TBoMS transmissions being set to "off."

Aspect 9: The method of any of Aspects 1-8, wherein the transmission occasion is identified as the first transmission occasion of the first repetition irrespective of any RRC parameters.

Aspect 10: The method of any of Aspects 1-9, wherein the transmission occasion is identified as the first transmission occasion of any repetition associated with RV index 0 irrespective of any RRC parameters.

Aspect 11: A method of wireless communication performed by a UE, comprising: identifying a transmission occasion at which to start an initial transmission of a TBoMS transmission triggered by a configured grant, wherein the transmission occasion corresponds to all slots of one repetition of the TBoMS transmission, the TBoMS transmission being configured with one or more repetitions, and wherein the transmission occasion is identified as one of: a first transmission occasion of a set of repetitions, or any transmission occasion of the set of repetitions; and transmitting the initial transmission of the TBoMS transmission based at least in part on the transmission occasion.

Aspect 12: The method of Aspect 11, wherein the transmission occasion is identified as the first transmission occasion of the set of repetitions based at least in part on an RV sequence configured for the UE being {0,2,3,1}.

Aspect 13: The method of any of Aspects 11-12, wherein the transmission occasion is identified as any transmission occasion of the set of repetitions based at least in part on the transmission occasion being associated with RV index 0.

Aspect 14: The method of Aspect 13, wherein the transmission occasion is identified as the any transmission occasion of the set of repetitions further based at least in part on an RV sequence configured for the UE being {0,3,0,3}.

Aspect 15: The method of any of Aspects 13-14, wherein the transmission occasion is identified as any transmission occasion of the set of repetitions based at least in part on an RV sequence configured for the UE being {0,0,0,0}.

Aspect 16: The method of Aspect 15, wherein the transmission occasion is identified as any transmission occasion of the set of repetitions other than a last transmission occasion of the set of repetitions when the set of repetitions includes eight more repetitions.

Aspect 17: The method of any of Aspects 11-16, wherein the transmission occasion is identified as the first transmission occasion based at least in part on a starting RV parameter used for Type A PUSCH repetitions being set to "off."

Aspect 18: The method of any of Aspects 11-17, wherein the transmission occasion is identified as the first transmission occasion based at least in part on a starting RV parameter used for TBoMS transmissions being set to "off."

Aspect 19: The method of any of Aspects 11-18, wherein the transmission occasion is identified as the first transmission occasion irrespective of any RRC parameters.

Aspect 20: The method of any of Aspects 11-19, wherein the transmission occasion is identified as any transmission occasion of the set of repetitions associated with RV index 0 irrespective of any RRC parameters.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
a memory; and
one or more processors, coupled to the memory, configured to:
identify a transmission occasion at which to start an initial transmission of a transport block over multi-slots (TBoMS) transmission triggered by a configured grant; and
transmit the initial transmission of the TBoMS transmission based at least in part on the transmission occasion,
wherein the TBoMS transmission includes a set of repetitions,
wherein a repetition, of the set of repetitions, spans a first set of contiguous slots and a second set of contiguous slots,
wherein the first set of contiguous slots and the second set of contiguous slots are separated by one or more slots, and
wherein, to identify the transmission occasion, the one or more processors are configured to identify the transmission occasion as a first transmission occasion of any repetition of the set of repetitions.

2. The apparatus of claim 1, wherein, to identify the transmission occasion, the one or more processors are configured to identify the transmission occasion as the first transmission occasion of any repetition based at least in part on the repetition being associated with redundancy version (RV) index 0.

3. The apparatus of claim 2, wherein, to identify the transmission occasion, the one or more processors are configured to identify the transmission occasion as the first transmission occasion of any repetition further based at least in part on a configured RV sequence being {0,3,0,3}.

4. The apparatus of claim 2, wherein, to identify the transmission occasion, the one or more processors are configured to identify the transmission occasion as the first transmission occasion of any repetition based at least in part on a configured RV sequence being {0,0,0,0}.

5. The apparatus of claim 4, wherein, to identify the transmission occasion, the one or more processors are configured to identify the transmission occasion as the first transmission occasion of any repetition other than a last repetition of the set of repetitions when the set of repetitions includes eight or more repetitions.

6. A method of wireless communication performed by an apparatus, comprising:
identifying a transmission occasion at which to start an initial transmission of a transport block over multi-slots (TBoMS) transmission triggered by a configured grant; and
transmitting the initial transmission of the TBoMS transmission based at least in part on the transmission occasion,
wherein the TBoMS transmission includes a set of repetitions,
wherein a repetition, of the set of repetitions, spans a first set of contiguous slots and a second set of contiguous slots,
wherein the first set of contiguous slots and the second set of contiguous slots are separated by one or more slots, and
wherein, to identify the transmission occasion, the method comprises identifying the transmission occasion as one of:
a first transmission occasion of a first repetition of the set of repetitions, or
a first transmission occasion of any repetition of the set of repetitions.

7. The method of claim 6, wherein, to identify the transmission occasion, the method comprises identifying the transmission occasion as the first transmission occasion of the first repetition based at least in part on a configured redundancy version (RV) sequence being {0,2,3, 1}.

8. The method of claim 6, wherein, to identify the transmission occasion, the method comprises identifying the transmission occasion as the first transmission occasion of any repetition based at least in part on the repetition being associated with redundancy version (RV) index 0.

9. The method of claim 8, wherein, to identify the transmission occasion, the method comprises identifying the transmission occasion as the first transmission occasion of any repetition further based at least in part on a configured RV sequence being {0,3,0,3}.

10. The method of claim 8, wherein, to identify the transmission occasion, the method comprises identifying the transmission occasion as the first transmission occasion of any repetition based at least in part on a configured RV sequence being {0,0,0,0}.

11. The method of claim 10, wherein, to identify the transmission occasion, the method comprises identifying the transmission occasion as the first transmission occasion of any repetition other than a last repetition of the set of repetitions when the set of repetitions includes eight or more repetitions.

12. The method of claim 6, wherein, to identify the transmission occasion, the method comprises identifying the transmission occasion as the first transmission occasion of the first repetition based at least in part on a starting redundancy version (RV) parameter used for Type A physical uplink shared channel (PUSCH) repetitions being set to "off".

13. The method of claim 6, wherein, to identify the transmission occasion, the method comprises identifying the transmission occasion as the first transmission occasion of the first repetition based at least in part on a starting redundancy version (RV) parameter used for TBoMS transmissions being set to "off".

14. The method of claim 6, wherein, to identify the transmission occasion, the method comprises identifying the transmission occasion as the first transmission occasion of the first repetition irrespective of any radio resource control (RRC) parameters.

15. The method of claim 6, wherein, to identify the transmission occasion, the method comprises identifying the transmission occasion as the first transmission occasion of any repetition associated with redundancy version (RV) index 0 irrespective of any radio resource control (RRC) parameters.

16. An apparatus for wireless communication, comprising:
a memory; and
one or more processors, coupled to the memory, configured to:
identify a transmission occasion at which to start an initial transmission of a transport block over multi-slots (TBoMS) transmission triggered by a configured grant; and
transmit the initial transmission of the TBoMS transmission based at least in part on the transmission occasion,
wherein the TBoMS transmission includes a set of repetitions,
wherein a repetition, of the set of repetitions, spans a first set of contiguous slots and a second set of contiguous slots,
wherein the first set of contiguous slots and the second set of contiguous slots are separated by one or more slots, and
wherein, to identify the transmission occasion, the one or more processors are configured to identify the transmission occasion as a first transmission occasion of a first repetition of the set of repetitions based at least in part on a configured redundancy version (RV) sequence being {0,2,3, 1}.

17. An apparatus for wireless communication, comprising:
a memory; and
one or more processors, coupled to the memory, configured to:
identify a transmission occasion at which to start an initial transmission of a transport block over multi-slots (TBoMS) transmission triggered by a configured grant; and
transmit the initial transmission of the TBoMS transmission based at least in part on the transmission occasion,
wherein the TBoMS transmission includes a set of repetitions,
wherein a repetition, of the set of repetitions, spans a first set of contiguous slots and a second set of contiguous slots,
wherein the first set of contiguous slots and the second set of contiguous slots are separated by one or more slots, and
wherein, to identify the transmission occasion, the one or more processors are configured to identify the transmission occasion as a first transmission occasion of the set of repetitions based at least in part on a configured redundancy version (RV) sequence being {0,2,3,1}.

18. An apparatus for wireless communication, comprising:
a memory; and
one or more processors, coupled to the memory, configured to:
identify a transmission occasion at which to start an initial transmission of a transport block over multi-slots (TBoMS) transmission triggered by a configured grant; and
transmit the initial transmission of the TBoMS transmission based at least in part on the transmission occasion,
wherein the TBoMS transmission includes a set of repetitions,
wherein a repetition, of the set of repetitions, spans a first set of contiguous slots and a second set of contiguous slots,
wherein the first set of contiguous slots and the second set of contiguous slots are separated by one or more slots, and
wherein, to identify the transmission occasion, the one or more processors are configured to identify the transmission occasion as a first transmission occasion of any repetition of the set of repetitions based at least in part on a configured redundancy version (RV) sequence being {0,3,0,3} or {0,0,0, 0}.

19. The apparatus of claim 18, wherein, to identify the transmission occasion, the one or more processors are configured to identify the transmission occasion as the first transmission occasion of any repetition based at least in part on the transmission occasion being associated with redundancy version (RV) index 0.

20. The apparatus of claim 19, wherein the configured RV sequence is {0,3,0,3}.

21. The apparatus of claim 19, wherein the configured RV sequence is {0,0,0,0}.

22. An apparatus for wireless communication, comprising:
a memory; and
one or more processors, coupled to the memory, configured to:
identify a transmission occasion at which to start an initial transmission of a transport block over multi-slots (TBoMS) transmission triggered by a configured grant; and
transmit the initial transmission of the TBoMS transmission based at least in part on the transmission occasion,
wherein the TBoMS transmission includes a set of repetitions,
wherein a repetition, of the set of repetitions, spans a first set of contiguous slots and a second set of contiguous slots,
wherein the first set of contiguous slots and the second set of contiguous slots are separated by one or more slots, and
wherein, to identify the transmission occasion, the one or more processors are configured to identify, based at least in part on a configured RV sequence being {0,3,0,3} or {0,0,0,0}, the transmission occasion as any transmission occasion of the set of repetitions associated with redundancy RV index 0.

23. The apparatus of claim 22, wherein the configured RV sequence is {0,3,0,3}.

24. The apparatus of claim 22, wherein the configured RV sequence is {0,0,0,0}.

* * * * *